United States Patent
Anno et al.

(10) Patent No.: US 7,127,035 B2
(45) Date of Patent: Oct. 24, 2006

(54) ROTARY ANODE TYPE X-RAY TUBE

(75) Inventors: Hidero Anno, Otawara (JP); Shin Saito, Otawara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 26 days.

(21) Appl. No.: 10/487,882

(22) PCT Filed: Aug. 29, 2002

(86) PCT No.: PCT/JP02/08699

§ 371 (c)(1),
(2), (4) Date: Feb. 26, 2004

(87) PCT Pub. No.: WO03/019610

PCT Pub. Date: Mar. 6, 2003

(65) Prior Publication Data
US 2004/0234033 A1 Nov. 25, 2004

(30) Foreign Application Priority Data

| Aug. 29, 2001 | (JP) | ............................. 2001-259087 |
| Aug. 31, 2001 | (JP) | ............................. 2001-264281 |
| Jan. 28, 2002 | (JP) | ............................. 2002-018592 |

(51) Int. Cl.
*H01J 35/10* (2006.01)
(52) U.S. Cl. ................ 378/133; 378/130; 378/144
(58) Field of Classification Search ................ 378/127, 378/128, 129, 130, 132, 133, 144
See application file for complete search history.

(56) References Cited

U.S. PATENT DOCUMENTS

| 4,736,400 | A | | 4/1988 | Koller et al. | |
| 4,949,369 | A | * | 8/1990 | Bittl | ............... 378/130 |
| 5,204,890 | A | * | 4/1993 | Anno et al. | ............... 378/133 |
| 5,224,142 | A | * | 6/1993 | Ono et al. | ............... 378/128 |
| 5,384,818 | A | * | 1/1995 | Ono et al. | ............... 378/132 |
| 5,559,852 | A | | 9/1996 | Vetter | |
| 5,652,778 | A | | 7/1997 | Tekriwal | |
| 5,838,763 | A | | 11/1998 | Hiller et al. | |
| 5,930,332 | A | * | 7/1999 | Eggleston et al. | ............... 378/144 |

FOREIGN PATENT DOCUMENTS

| CN | 1293447 A | 5/2001 |
| DE | 44 03 116 A1 | 8/1995 |
| DE | 37 51 638 T2 | 7/1996 |
| DE | 196 42 217 A1 | 4/1997 |
| EP | 0 229 697 A2 | 7/1987 |
| EP | 0 666 585 A1 | 8/1995 |
| EP | 1 094 491 A2 | 4/2001 |

(Continued)

*Primary Examiner*—Edward J. Glick
*Assistant Examiner*—Chih-Cheng Glen Kao
(74) *Attorney, Agent, or Firm*—Pillsbury Winthrop Shaw Pittman LLP

(57) ABSTRACT

An anode target is roratably supported by a rotating mechanism having a rotary body and a staionary body. A fitted portion between the rotary body and the stationary body is formed of bearing areas having dynamic pressure type sliding bearings and a non-bearing area having a clearance between the rotary body and the stationary body larger than that in the bearing areas. The rotary body facing the non-bearing area is positioned where a time for heat transfer from the anode target is shorter than the rotary body facing the bearing areas. Thus, the characteristics of heat radiation from the anode target can be improved, and a stable bearing operation can be maintained.

9 Claims, 22 Drawing Sheets

FOREIGN PATENT DOCUMENTS

| | | |
|---|---|---|
| JP | 62-168317 | 7/1987 |
| JP | 2-244545 | 9/1990 |
| JP | 5-144395 | 6/1993 |
| JP | 6-76772 | 3/1994 |
| JP | 7-226177 | 8/1995 |
| JP | 9-171789 | 6/1997 |
| JP | 2001-189143 | 7/2001 |
| KR | 2001-0051058 | 6/2001 |

* cited by examiner

PRIOR ART

ROTARY ANODE TYPE X-RAY TUBE

CROSS-REFERENCE TO RELATED APPLICATIONS

This application is the National Phase of International Application No. PCT/JP02/08699 filed Aug. 29, 2002, which designated the U.S. and was published on Mar. 6, 2003 as International Publication No. WO 03/019610 A1, which is based upon and claims the benefit of priority from prior Japanese Patent Application Nos. 2001-259087, filed Aug. 29, 2001, 2001-264281, filed Aug. 31, 2001, and 2002-018592, filed Jan. 28, 2002, the entire contents all of which are incorporated herein by reference.

TECHNICAL FIELD

The present invention relates to a rotary anode type X-ray tube using dynamic pressure type sliding bearings.

BACKGROUND ART

The rotary anode type X-ray tube has a structure that an anode target for radiating X-rays is rotatably supported by a rotating mechanism, and an electron beam is emitted to the anode target rotating at a high speed to irradiate the X-rays from the anode target. The rotating mechanism for supporting the anode target is comprised of a rotary body, a stationary body and the like, and bearings are disposed between the rotary body and the stationary body. For a bearing section, there is used a rolling-element bearing such as a ball bearing or a dynamic pressure type sliding bearing which has helical grooves formed on a bearing surface and supplies a liquid metal lubricant such as gallium (Ga) or gallium (Ga)-indium (In)-tin (Sn) alloy to the helical grooves and the like.

A conventional rotary anode type X-ray tube will be described with reference to FIG. 21. The rotary anode type X-ray tube shown in FIG. 21 has a dynamic pressure type sliding bearing in a bearing section. A rotary anode type X-ray tube 1 shown in FIG. 21 is housed in a housing vessel 2. The rotary anode type X-ray tube 1 has a cathode 4 and an anode target 5 mutually opposed in a vacuum vessel 3. The anode target 5 is connected to a rotary shaft 7 or the like of a rotating mechanism 6 and rotatably supported by the rotating mechanism 6. The rotating mechanism 6 has a rotary body 8 connected to the rotary shaft 7 and a stationary body 9 fitted to the rotary body 8.

The bottom end opening of the rotary body 8 is sealed with a thrust ring 10, and the stationary body 9 is extended to the outside through the thrust ring 10. And, a hole 11 forming a cooling passage through which a cooling medium flows is formed in the stationary body 9 along the tube axis. The bottom end of the stationary body 9 is connected air-tight to fix to a sealing ring 12 for sealing one end of the vacuum vessel 3. And, a stator 13 is disposed outside of the vacuum vessel 3.

When the rotary anode type X-ray tube 1 operates, the rotary body 8 and the anode target 5 are rotated at a high speed by a rotating magnetic field generated by the stator 13. Under this condition, an electron beam e generated by the cathode 4 is accelerated by a high voltage between the anode and the cathode and impinged on the anode target 5 to emit X-rays. The X-rays are guided outside as indicated by arrow Y through an output window W1 disposed on the vacuum vessel 3 and an output window W2 disposed on the housing vessel 2.

The anode structure of the above-described rotary anode type X-ray tube 1 will be described with reference to FIG. 22. The rotary body 8 has a three-layered structure comprising an intermediate cylinder 8a connected to the rotary shaft 7, an inner cylinder 8b connected to the inside of the intermediate cylinder 8a, and an outer cylinder 8c connected to the exterior of the intermediate cylinder 8a. A blackened film 14 for radiating heat is formed on the exterior surface of the outer cylinder 8c. The bottom end opening of the inner cylinder 8b is sealed with the thrust ring 10.

The stationary body 9 is fitted into the inner cylinder 8b of the rotary body 8. The bottom end of the stationary body 9 passes through the thrust ring 10 to extend below it. Dynamic pressure type sliding bearings are disposed in the fitted surface of the inner cylinder 8b and the stationary body 9. For example, radial dynamic pressure type sliding bearings 15a, 15b are disposed on two remote portions in a tube axial direction on the external surface of the stationary body 9. And, dynamic pressure type sliding bearings 16a, 16b are disposed in a thrust direction on the top end surface of the stationary body 9 and the bottom stepped surface of the stationary body 9.

Herringbone pattern helical grooves 17 as shown in FIG. 23 are formed in pair on the radial dynamic pressure type sliding bearings 15a, 15b. Herringbone pattern helical grooves 18 are formed on the dynamic pressure type sliding bearings 16a, 16b in the thrust direction as shown in FIG. 24. A liquid metal lubricant of gallium or gallium alloy is supplied to the helical grooves 17, 18 and the gap of the fitted portion between the inner cylinder 8b and the stationary body 9. A non-bearing area 19, which is provided in the area interposed between the two bearings 15a, 15b disposed on the external surface of the stationary body 9, has a larger gap between the inner cylinder 8b and the stationary body 9 than those formed between the bearings 15a, 15b and the inner cylinder 8b and does not operate as a bearing. The gap of the non-bearing area 19 serves as, for example, a liquid metal lubricant storage section.

The gap between the inner cylinder 8b and the stationary body 9 is determined to have a bearing size so that the rotary body 8 can rotate stably. A specific size of the gap for the bearing section is variable depending on a rotating speed of the rotating part, a shape of the shaft, or the like. For example, the dynamic pressure type sliding bearings 15a, 15b have the gap between the inner surface of the inner cylinder 8b and the outer surface of the stationary body 9 determined to be about 1/1000 or less of the diameter of the stationary body 9 at the bearing sections as shown in FIG. 22.

When the rotary anode type X-ray tube 1 operates, the temperature of the anode target 5 increases by the irradiation of the electron beam. To release the heat of the anode target 5 to outside of the X-ray tube 1, the rotary anode type X-ray tube 1 using the dynamic pressure type sliding bearing employs the following method (see Japanese Patent Laid-Open Publications No. HEI 2-244545, No. HEI 5-144395, No. HEI 6-76772, No. HEI 7-226177 and No. HEI 9-171789, U.S. Pat. No. 5,838,763, etc.). For example, the heat of the anode target 5 is conducted to the rotary body 8 connected to the anode target 5. The heat is then conducted from the rotary body 8 to the stationary body 9 through the liquid metal lubricant in the bearing portions. And, the heat is radiated from the stationary body 9 to the outside of the X-ray tube 1. A passage for the cooling medium is formed in the stationary body 9.

According to the above-described method of releasing the heat from the conventional rotary anode type X-ray tube, an increase in temperature of the bearing section becomes great. For example, in the anode structure shown in FIG. 22, the heat of the anode target 5 is conducted from the rotary shaft 7 to the intermediate cylinder 8a and from the intermediate cylinder 8a to the stationary body 9 through the inner cylinder 8b and the bearing 15b. Thus, the heat of the anode target 5 is directly conducted to the bearing section, so that the increase in temperature of the bearing section becomes great.

Besides, as described in Japanese Patent Laid-Open Publication No. HEI 2-244545 and U.S. Pat. No. 5,838,763, when the anode target and the rotary body are mutually contacted to have a large contact area, quantity of heat conducted from the anode target to the rotary body increases, and the temperature of the bearing section becomes higher. As a result, there is a problem that the bearing-forming material and the liquid metal lubricant react to each other to make the bearing surface rough or the bearing gap size is varied by the reaction product. Such a problem has an adverse effect on the bearing operation, and the bearing operation cannot be maintained stably.

When the rotating anode type X-ray tube starts to operate, the rotary section of the rotating mechanism rotates, shearing energy is applied to the liquid metal lubricant and changes to heat, and the bearing section generates heat. The heat from the anode target is also applied to the bearing section as described above. Thus, Japanese Patent Laid-Open Publication No. HEI 7-226177 and Japanese Patent Laid-Open Publication No. HEI 9-171789 disclose a structure that a connecting portion having a heat resistant structure such as a cylinder is disposed between the anode target and the rotary body to decrease heat to be conducted to the rotary body.

To dispose the connecting portion, the anode target is connected to the connecting portion, and the connecting portion is connected to the rotary body of the rotating mechanism. For the coupled portion between the anode target and the connecting portion and the coupled portion between the rotary body and the connecting portion, either of them is integrally formed, and the other is mechanically contacted and fixed with a screw part. Such a coupling structure has high heat resistance, and an adequate heat transfer effect cannot be obtained. Magnitude of heat resistance is variable depending on the surface roughness of the contact portion, and a heat resistance value is variable depending on processing accuracy. When the heat resistance value is variable, for example, a temperature difference is caused in the rotary body within one tube or a temperature difference is caused in the rotary body depending on a tube. In such a case, it is necessary to design considering variations in temperature, and enhancement of the heat transfer effect is disturbed.

Besides, according to the conventional rotary anode type X-ray tube, to transfer the heat of the anode target from the rotary body to the stationary body through the bearing surface, the heat is finally transferred to the cooling medium flowing through the cooling passage formed in the stationary body. Quantity of heat transferred to the cooling medium becomes larger as the effective contact area between the stationary body and the cooling medium becomes larger. The effective contact area depends on a portion where heat is transferred effectively (e.g., a part of the cooling passage having a high surface temperature) in the surface area of the cooling passage. But, heat of the anode target is transferred to the cooling medium through a small region having a short distance among the heat routes from the rotary body to the cooling passage in the stationary body. Then, the effective contact area cannot be made adequately large, resulting in degradation of the operation characteristics of the bearing section.

This invention provides a rotary anode type X-ray tube which basically makes good conduction of heat of the anode target through a rotating mechanism and the like. Specifically, it is to provide a rotary anode type X-ray tube which suppresses the dynamic pressure type sliding bearing section from having a temperature increase and can maintain a stable bearing operation. And, it provides a rotary anode type X-ray tube which suppresses variations in heat transferred from the anode target to the rotary body of the rotating mechanism. Besides, it provides a rotary anode type X-ray tube having an improved heat transfer characteristic from the rotary body of the rotating mechanism to the stationary body.

SUMMARY OF THE INVENTION

A first rotary anode type X-ray tube according to an aspect of the invention is a rotary anode type X-ray tube, comprising a vacuum vessel; an anode target disposed in the vacuum vessel; and a rotating mechanism which is provided with a rotary body connected to the anode target and a stationary body fitted to the rotary body, rotatably supports the anode target, and has a first area where the rotary body and the stationary body are mutually opposed with a first gap therebetween and dynamic pressure type sliding bearings are disposed and a second area where the rotary body and the stationary body are mutually opposed with a second gap larger than the first gap therebetween and a liquid metal lubricant is filled in the second gap; wherein the rotary body opposed to the second area is located where a time for heat transfer from the anode target is shorter as compared with the rotary body opposed to the first area.

In the first rotary anode type X-ray tube of the invention, the second gap, which is a gap between the rotary body and the stationary body larger than that in the first area where the dynamic pressure type sliding bearings are disposed, is disposed as a non-bearing area, and the second area is positioned where a time for heat transfer from the anode target is shorter as compared with the first area. Therefore, the heat transfer from the rotary body to the stationary body is mostly made through the second gap as the non-bearing area. Thus, the quantity of heat transferred through the first area as the bearing area is decreased, and the bearing area can be suppressed from having a temperature increase.

A second rotary anode type X-ray tube according to an aspect of the invention comprises a vacuum vessel; an anode target disposed in the vacuum vessel; a connecting portion which is at least partly formed of a cylindrical portion and connected to the anode target by metal bonding or integral forming; and a rotating mechanism which is provided with a rotary body connected to the connecting portion by metal bonding or integral forming and a stationary body having a dynamic pressure type sliding bearing on a fitted portion with the rotary body and rotatably supports the anode target through the connecting portion.

In the second rotary anode type X-ray tube of the invention, the anode target and the connecting portion are coupled by metal bonding or integral forming, and the connecting portion and the rotary body are coupled by metal bonding or integral forming. When configured as above, all the heat transfer routes from the anode target to the rotary body can be coupled metallographically. As a result, a part of simple mechanical contact of metals is eliminated from the heat transfer routes, and variations in heat resistance value of the heat transfer routes can be prevented.

A third rotary anode type X-ray tube according to an aspect of the invention comprises a vacuum vessel; an anode target disposed in the vacuum vessel; a rotating mechanism which is provided with a rotary body connected to the anode target and a stationary body having a dynamic pressure type sliding bearing using a liquid metal lubricant disposed in a fitted portion with the rotary body and rotatably supports the anode target; and a heat transfer promoter which is connected to the outer surface of the rotary body and formed of a member having a heat conduction rate higher than that of the rotary body.

In the third rotary anode type X-ray tube of the invention, the heat transfer promoter is connected to the outer surface of the rotary body. Therefore, the heat of the anode target is transferred to the rotary body through the heat transfer promoter, and the heat can be transferred from a large area of the rotary body to the stationary body. Thus, the effective contact area between the stationary body and the cooling medium increases, and the cooling efficiency of the anode target can be improved.

BEST MODE FOR CARRYING OUT THE INVENTION

Embodiments of the invention will be described with reference to the accompanying drawings.

Figure 1:
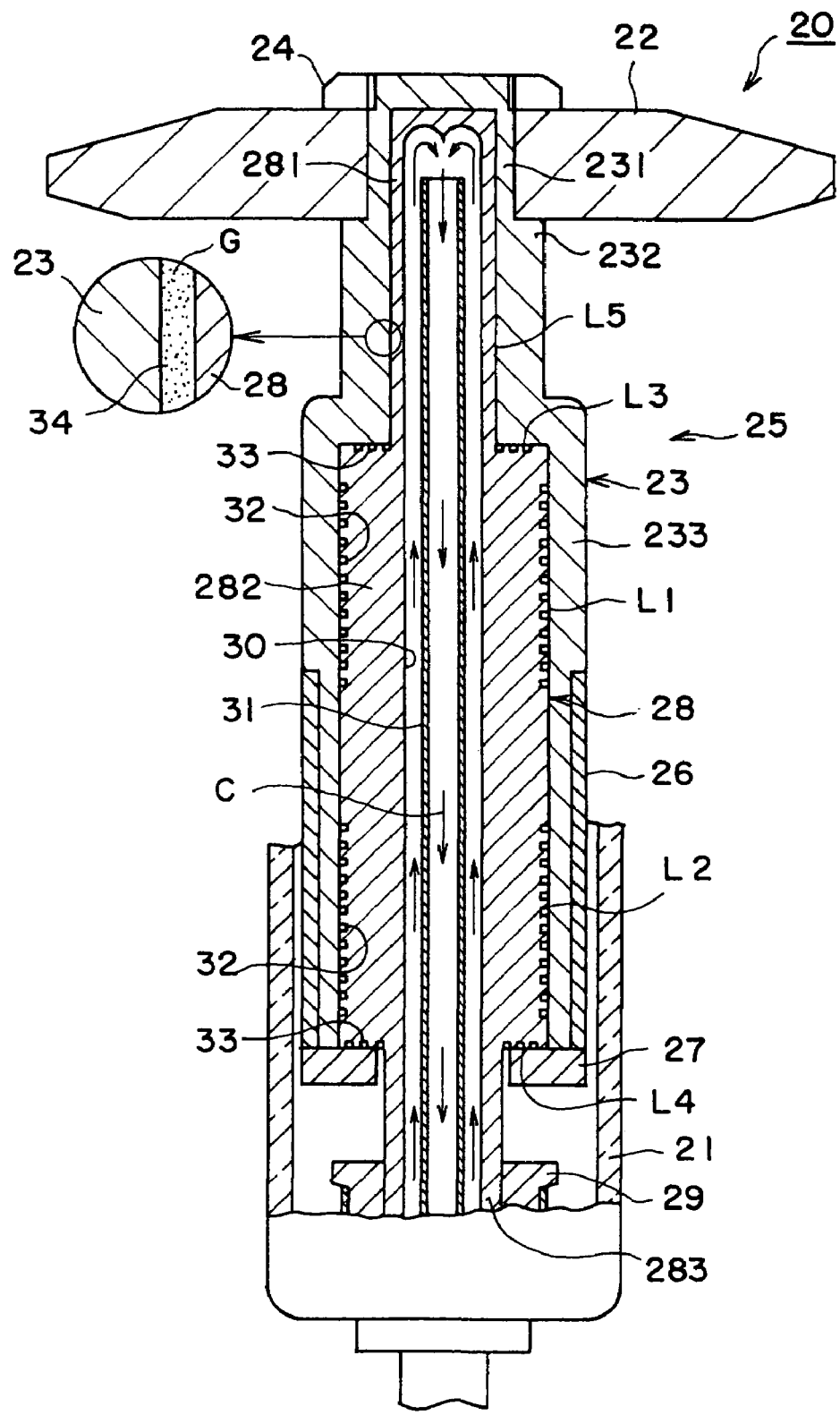
FIG. 1 is a vertical sectional diagram showing a structure of the main part of the rotary anode type X-ray tube according to a first embodiment of a first aspect of the invention.

First, embodiments of the rotary anode type X-ray tube according to a first aspect of the invention will be described. FIG. 1 is a vertical sectional diagram showing a structure of the main part of the rotary anode type X-ray tube according to a first embodiment of the first aspect of the invention. A rotary anode type X-ray tube 20 shown in FIG. 1 has, for example, a glass vacuum vessel 21. The vacuum vessel 21 shown in FIG. 1 is its part. A disk-shape anode target 22 for emitting X-rays is disposed in the vacuum vessel 21. The anode target 22 is formed of a heavy metal or the like.

The anode target 22 is fixed to the outer peripheral surface of a cylindrical rotary body 23 of a high melting-point metal with a nut 24. The rotary body 23 configures a rotating portion of a rotating mechanism 25 for rotatably supporting the anode target 22. The rotary body 23 has a first section 231 located on the top, a second section 232 having an outside diameter larger than that of the first section and located at the middle portion and a third section 233 having an outside diameter larger than that of the second section 232 and located below the second section 232. A high conductive cylindrical rotary body 26 is connected to a part of the third section 233.

The top end of the first section 231 of the rotary body 23 is inserted through a through hole of the anode target 22 and has the anode target 22 fixed to its outer peripheral surface. The bottom end opening of the third section 233 is sealed with a thrust ring 27. A stationary body 28 is fitted in the space formed in the rotary body 23. The inside space of the rotary body 23 is formed to open from the inside of the first section 231 toward the lower section. The rotary body 23 shown in FIG. 1 has a structure having a cylindrical connecting portion integrally formed which is to be described later in detail.

The stationary body 28 is formed of, for example, a high melting-point metal and configures the stationary portion of the rotating mechanism 25 which rotatably supports the anode target 22. The stationary body 28 has a first small-diameter section 281 which is located on the upper end portion and has a small outside diameter, a middle large-diameter section 282 having an outside diameter larger than that of the first small-diameter section 281 and a second small-diameter section 283 which has an outside diameter smaller than that of the large-diameter section 282 and located at the bottom end portion. The stationary body 28 has a bottomed cylindrical form having the top end of the first small-diameter section 281 as a bottom, and the second small-diameter section 283 pierces through the thrust ring 27 and its leading end is connected air-tight to the vacuum vessel 21 through a cylindrical sealing member 29.

A hole 30 is formed in the stationary body 28 along its tube axis, and a pipe 31 is inserted into the hole 30. The bottom ends of the hole 30 and the pipe 31 are open to the outside of the vacuum vessel 21. The top end of the pipe 31 is open in the vicinity of the bottom in the first small-diameter section 281 of the stationary body 28. A passage through which a cooling medium flows is formed of the hole 30 and the pipe 31 in the stationary body 28. For example, the cooling medium introduced from the outside of the vacuum vessel 21 rises through the gap between the pipe 31 and the stationary body 28 then falls through the pipe 31 as indicated by arrows C and is discharged outside from the vacuum vessel 21.

Dynamic pressure type sliding bearings are disposed at the fitted portion between the rotary body 23 and the stationary body 28. Specifically, a pair of herringbone pattern helical grooves 32 are formed on two upper and lower portions (areas L1, L2 in the drawing) of the exterior of the large-diameter section 282 of the stationary body 28, and radial dynamic pressure type sliding bearings are disposed. Herringbone pattern helical grooves 33 are formed on the top and bottom end surfaces of the large-diameter section 282 of the stationary body 28 (areas L3, L4 in the drawing), and thrust dynamic pressure type sliding bearings are disposed.

In the bearing areas L1 to L4 having the dynamic pressure type sliding bearings formed, the gap between the rotary body 23 and the stationary body 28 or the gap between the thrust ring 27 and the stationary body 28 is determined to be in a range of, for example, 10 to 30 μm. A liquid metal lubricant is supplied to the gaps of the bearing areas L1 to L4 and to the helical grooves 32, 33. The bearing surfaces on the sides of the rotary body 23 and the thrust ring 27 may be smooth or have helical grooves.

In the fitted portion between the rotary body 23 and the stationary body 28, an area L5, where the gap between the rotary body 23 and the stationary body 28 is larger than those of the bearing areas L1 to L4, and which substantially does not operate as a bearing, namely called as a non-bearing area, is disposed on the side closer to the anode target 22, e.g., a portion surrounded by the through hole of the anode target 22, than the bearing areas L1 to L4. The non-bearing area L5 is disposed on a portion where the first section 231, the second section 232 and a part of the third section 233 of the rotary body 23 and the first small-diameter section 281 of the stationary body 28 are opposed to each other in the tube axial direction.

The gap of the non-bearing area L5 is determined to have a size, for example, in a range of 30 to 500 μm so that the rotary body 23 and the stationary body 28 are not contacted to each other in an ordinary operating condition. And, a liquid metal lubricant 34 is filled in a gap G between the rotary body 23 and the stationary body 28 of the non-bearing area L5 as shown as an enlarged view in the circle of the drawing in the same way as the bearing areas L1 to L4.

For the liquid metal lubricant 34, for example, Ga, Ga—In—Sn, or another material mainly containing Ga is used. And, a Bi—In—Pb—Sn alloy containing a relatively large amount of bismuth (Bi) or an In—Bi alloy or an In—Bi—Sn alloy containing a relatively large amount of In can also be used. The liquid metal lubricant 34 has a melting point of room temperature or higher, so that it is desirable that the liquid metal lubricant is preheated to a temperature of its melting point or higher into a liquid form before the anode target 22 is rotated.

In the rotary anode type X-ray tube 20 configured as described above, a rotational torque is generated in the rotary body 23 of the rotating mechanism 25 by a rotating magnetic field generated by a stator coil (not shown) which is disposed outside of the vacuum vessel 21. This rotational torque is transferred to the anode target 22 to rotate the anode target 22. In this state, an electron beam is irradiated to the anode target 22 to emit X-rays from the anode target 22.

When the rotary anode type X-ray tube 20 starts to operate, the temperature of the anode target 22 is raised by the irradiation of the electron beam. Heat of the anode target 22 is dissipated by radiation but partly transferred from the anode target 22 to the rotary body 23. The heat transferred to the rotary body 23 is further transferred to the stationary body 28 and externally dissipated through a cooling medium flowing within the stationary body 28.

According to the heat transfer mechanism described above, the distance (spatial distance) of the non-bearing area L5 from the anode target 22 in the rotary anode type X-ray tube 20 shown in FIG. 1 is shorter than those of the bearing areas L1 to L4 from the anode target 22. In other words, the non-bearing area L5 is located where a time for heat transfer from the anode target 22 is shorter as compared with the bearing areas L1 to L4. Therefore, the heat transfer from the rotary body 23 to the stationary body 28 is mostly made via the non-bearing area L5. Then, quantity of heat passing through the bearing areas L1 to L4 is reduced, and the bearing areas L1 to L4 are prevented from having a temperature increase. As a result, the material forming the bearing surface and the liquid metal lubricant are prevented from reacting mutually, bearing surface roughness and a change in bearing gap size are decreased, and a stable bearing operation can be maintained.

When operating, the temperature of the non-bearing area L5 increases to about 400 to 500° C. Therefore, the non-bearing surface material of the rotary body 23 and the stationary body 28 and the liquid metal lubricant may mutually react to grow a reaction layer. But, it does not cause an adverse effect on rotational characteristics because the non-bearing area L5 has a large gap.

In the embodiment described above, the anode target 22 was directly connected to a part of the rotary body 23 of the non-bearing area L5. In addition to the above structure, it is also possible to configure that the anode target 22 is fixed to a heat conduction member or the like, and the anode target 22 and a part of the rotary body 23 of the non-bearing area L5 are indirectly connected mechanically or thermally through the heat conduction member.

In the rotary anode type X-ray tube 20 according to the first embodiment described above, the rotary body 23, the thrust ring 27 and the stationary body 28 can be configured of a material, for example, molybdenum or a molybdenum alloy. Instead of such a material, tungsten, a tungsten alloy, tantalum or a tantalum alloy can also be used. Tungsten and tantalum have a property that they are not easily corroded by the liquid metal lubricant as compared with molybdenum or a molybdenum alloy.

Besides, the surfaces of the rotary body 23 and the stationary body 28 which are located in the non-bearing area L5 may be applied a heat-resistant coating formed of a high melting-point substance mainly consisting of at least one element selected from oxide or boride of chromium, nitride, carbide or boride of vanadium, oxide, nitride, carbide or boride of hafnium, oxide, nitride, carbide or boride of titanium, tungsten, nitride, carbide or boride of tungsten, molybdenum, nitride, carbide or boride of molybdenum, oxide, nitride, carbide or boride of zirconium, tantalum, nitride, carbide or boride of tantalum, niobium, nitride, carbide or boride of niobium, ruthenium, rhenium, osmium, iridium, boron nitride, boron carbide, aluminum oxide, aluminum nitride, aluminum carbide, aluminum boride, silicone nitride, silicone carbide, silicone boride, diamond, carbon (including DLC and graphite), magnesium oxide and beryllium oxide.

The application of such a heat-resistant coating enables to raise a heat-resistant temperature of the non-bearing area L5 during the operation and to improve the cooling capacity of the anode target 22. And, a metal material (iron-based material) mainly consisting of iron can be used as a base metal for the rotary body 23 and the stationary body 28, and the rotary body 23 and the stationary body 28 which have a heat-resistant coating of the above-described high melting-point substance applied to the surface of the iron-based material including the bearing areas L1 to L4 and the non-bearing area L5 can also be used.

Figure 2:
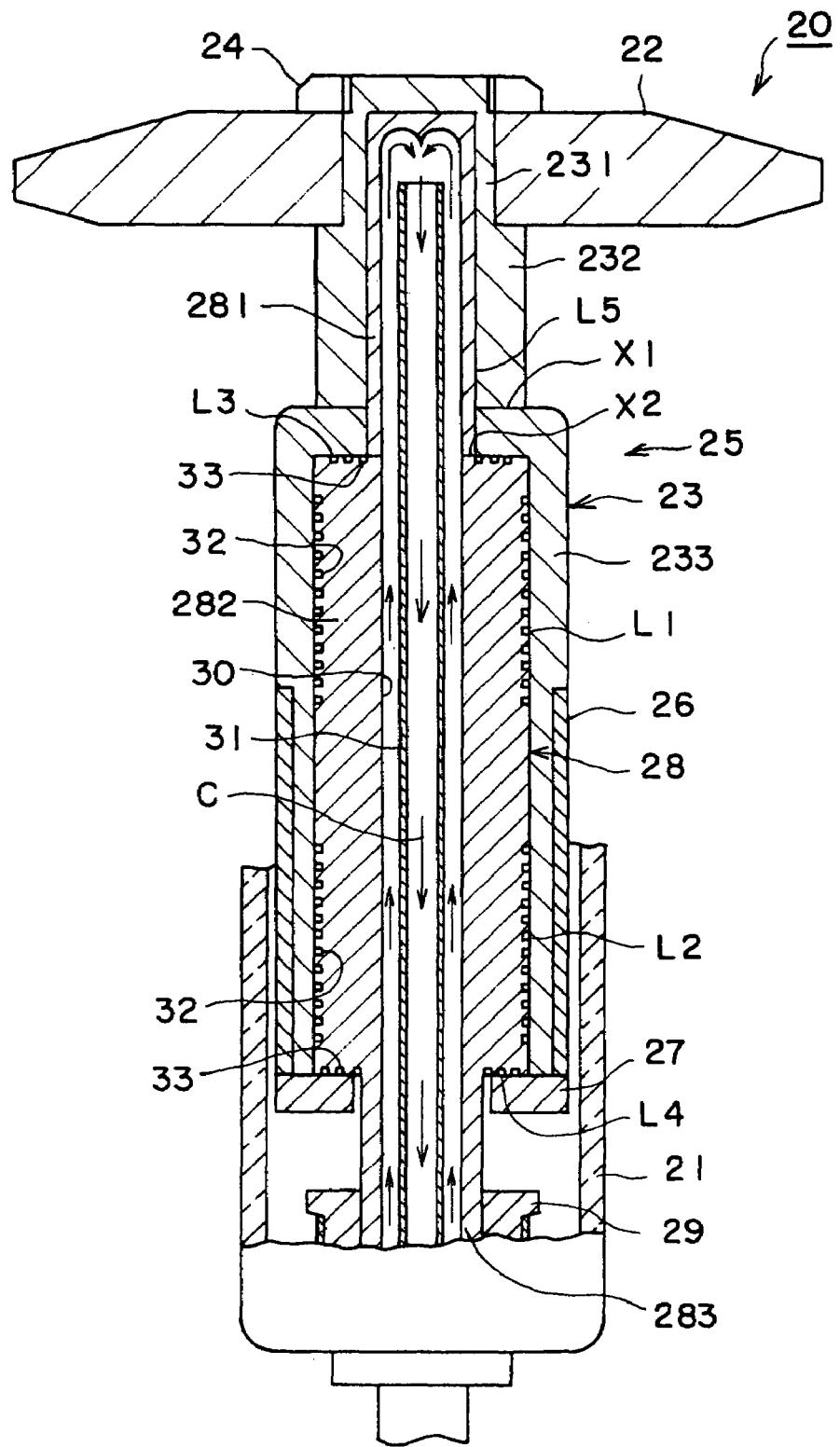
FIG. 2 is a vertical sectional diagram showing a structure of the main part of the rotary anode type X-ray tube according to a second embodiment of the first aspect of the invention.

Then, a second embodiment of the rotary anode type X-ray tube according to the first aspect of the invention will be described with reference to FIG. 2. In FIG. 2, same numerals are used to denote same parts in FIG. 1, and a repeated description of those portions is partially omitted. In the rotary anode type X-ray tube 20 of the second embodiment shown in FIG. 2, the second section 232 and the third section 233 of the rotary body 23 are mutually connected at a part indicated by numeral X1. And, the first small-diameter section 281 and the large-diameter section 282 of the stationary body 28 are mutually connected at a part indicated by numeral X2.

The first section 231 and the second section 232 of the rotary body 23 and the first small-diameter section 281 of the stationary body 28 are formed of a high melting-point metal selected from molybdenum, a molybdenum alloy, tungsten, a tungsten alloy, tantalum and a tantalum alloy. And, the third section 233 of the rotary body 23 and the large-diameter section 282 and the second small-diameter section 283 of the stationary body 28 are formed of an iron-based metal material mainly consisting of iron selected from iron, steel, alloyed steel, an iron-nickel alloy, an iron-chromium alloy and an iron-nickel-chromium alloy.

A liquid metal lubricant is present around the connected portions X1, X2. Therefore, when the connected portions X1, X2 are formed of a brazing material, they are corroded by the liquid metal lubricant, resulting in causing a connection failure. Therefore, the second section 232 and the third section 233 of the rotary body 23 and the first small-diameter section 281 and the large-diameter section 282 of the stationary body 28 are respectively connected by a metal bonding method such as atomic diffusion welding, e.g., diffusion welding or friction welding. Such a metal bonding method suppresses variations in a heat resistance value of the heat transfer route.

In the rotary anode type X-ray tube 20 of the second embodiment, the bearing surfaces of the bearing areas L1 to L4 are formed of a metal material mainly consisting of iron. The metal material mainly consisting of iron can be fabricated with ease, and the bearing can be produced with high accuracy. And, the metal mainly consisting of iron is a ferromagnetic material, so that an efficiency of magnetic connection with the rotating magnetic field can be improved. Forming a ceramic film of titanium nitride or the like on the non-bearing surface of the non-bearing area L5 can further enhance erosion resistance against the liquid metal lubricant.

Figure 3:
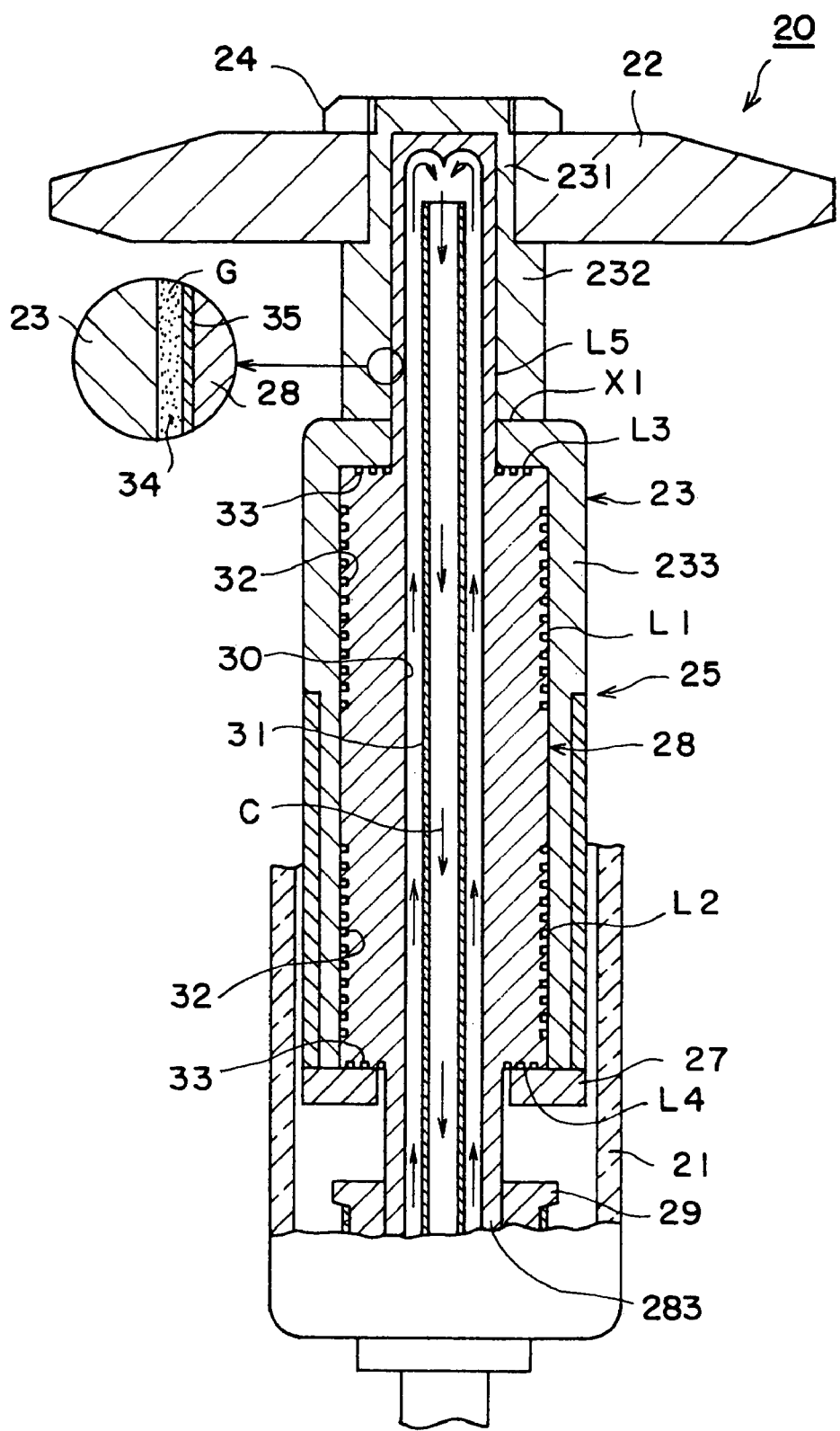
FIG. 3 is a vertical sectional diagram showing a structure of the main part of the rotary anode type X-ray tube according to a third embodiment of the first aspect of the invention.

Then, a third embodiment of the rotary anode type X-ray tube according to the first aspect of the invention will be described with reference to FIG. 3. In FIG. 3, same numerals are used to denote same parts in FIG. 1 and FIG. 2, and a repeated description of those portions is partially omitted. In the rotary anode type X-ray tube 20 of the third embodiment shown in FIG. 3, the rotary body 23 has the second section 232 and the third section 233 mutually connected at the connected portion X1 in the same manner as in FIG. 2. The first section 231 and the second section 232 which are integrally formed and the third section 233 are formed of a different type of metal material.

For example, the first section 231 and the second section 232 which are integrally formed are formed of a high melting-point metal material, and the third section 233 is formed of a metal material mainly consisting of iron. The stationary body 28 has its base material formed of a metal material mainly consisting of iron which is easily fabricated and inexpensive, and a heat-resistant coating 35 is applied to the surface (non-bearing surface) of the stationary body 28 in the non-bearing area L5 as shown as an enlarged view in the circle of FIG. 3. For the heat-resistant coating 35, a material similar to the high melting-point substance described in the first embodiment can be used.

The heat-resistant coating 35 is formed by, for example, masking portions other than those to be a non-bearing surface of the base material and covering the surface to be the non-bearing surface with a high melting-point substance by a CVD (chemical vapor deposition) process, a PACVD (plasma activation chemical vapor deposition) process, an MOCVD (metalorganic chemical vapor deposition) process or a PVD (physical vapor deposition) process such as ion plating or a thermal spraying process. It is desirable that the heat-resistant coating 35 has a thickness of about 0.5 to 20 μm. The heat-resistant coating 35 can also be formed by a process such as a molten salt bath immersion, a heat treating method in the atmosphere of gas, or the like.

In the above-described structure, molybdenum, molybdenum alloy, tungsten, tungsten alloy, tantalum or tantalum alloy is used as a material for the non-bearing surface of the rotary body 23. The formation of the heat-resistant coating 35 is desirably limited to the area of the non-bearing surface where the opposed surfaces of the rotary body 23 and the stationary body 28 are not directly contacted mechanically. But, the heat-resistant coating 35 may be formed on the bearing surface when the heat-resistant coating 35 has an adequately high degree of adhesion and abrasion resistance.

Figure 4:
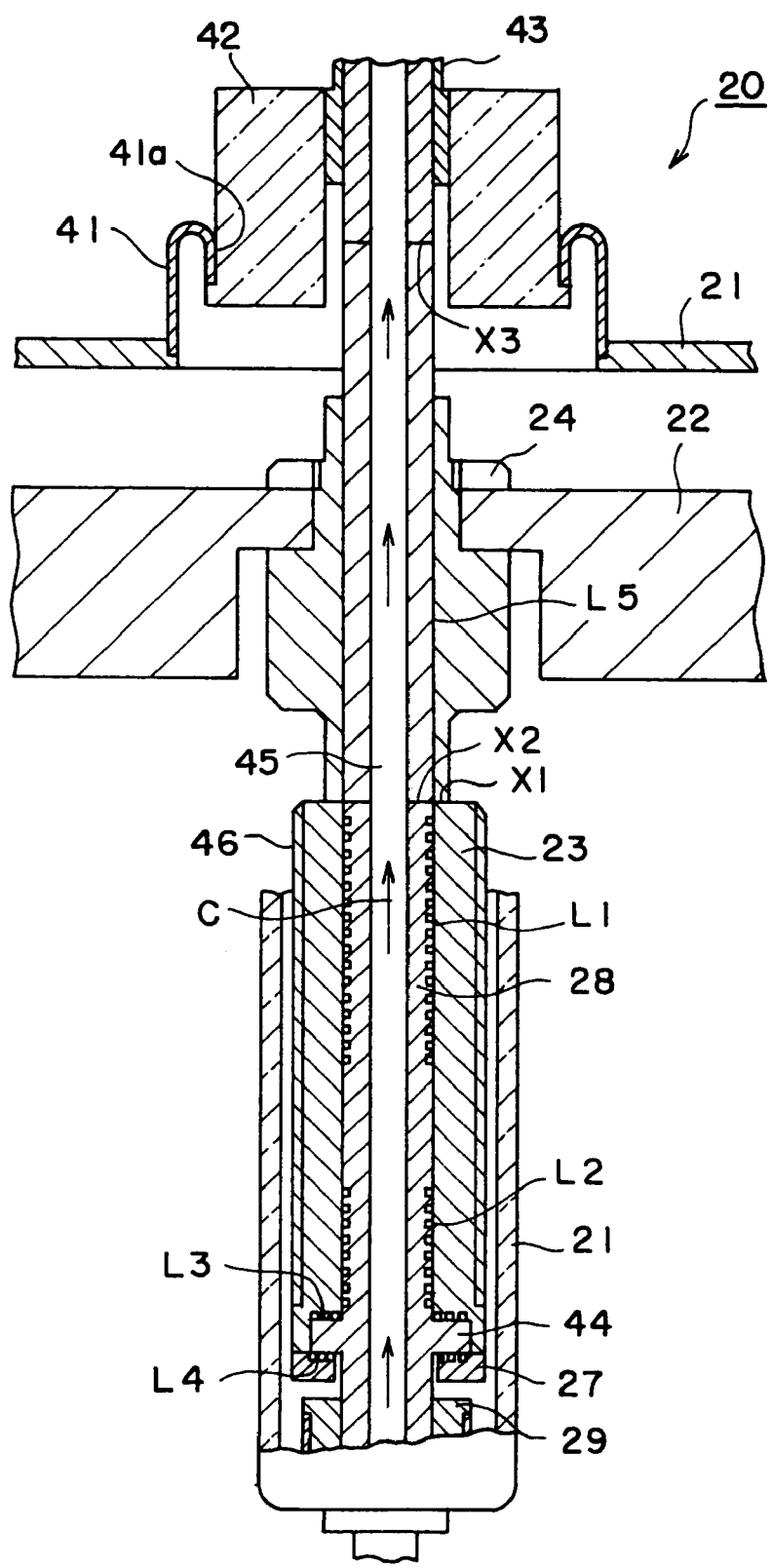
FIG. 4 is a vertical sectional diagram showing a structure of the main part of the rotary anode type X-ray tube according to a fourth embodiment of the first aspect of the invention.

Then, a fourth embodiment of the rotary anode type X-ray tube according to the first aspect of the invention will be described with reference to FIG. 4. In FIG. 4, same numerals are used to denote same parts in FIG. 1 to FIG. 3, and a repeated description of those portions is partially omitted. In the rotary anode type X-ray tube 20 according to the fourth embodiment shown in FIG. 4, a cylindrical fixing ring 41 is disposed on a part of the vacuum vessel 21, and a cylindrical fixing member 42 of an insulating material is connected to a bent section 41a which is formed by bending the upper portion of the fixing ring 41. A cylindrical connection member 43 is connected to the inside of the cylindrical fixing member 42.

The top end of the stationary body 28 passes through the anode target 22 and is connected air-tight to the inside of the cylindrical connection member 43. The top end of the stationary body 28 has a structure that a different metal material is connected at the connected portion indicated by numeral X3. And, a projection 44 protruding in a flange shape is formed next to the thrust ring 27 of the stationary body 28. A through hole 45 is formed from the top to bottom in the stationary body 28 along the tube axis. Top and bottom ends of the through hole 45 are open to outside of the vacuum vessel 21.

A cylindrical outer rotary body 46 is connected to the outer surface of the rotary body 23. The bottom end opening of the through hole 45 forms an inlet for the cooling medium, and the top end opening forms an outlet for the cooling medium. Thus, a passage for the cooling medium is formed in the stationary body 28 as indicated by arrows C. Helical grooves are formed on an end surface of the rotary body 23 opposed to the upper surface of the projection 44 and on the surface of the thrust ring 27 opposed to the lower surface of the projection 44. A dynamic pressure type sliding bearing is disposed on bearing areas L3, L4 in a thrust direction. The rotary body 23 and the stationary body 28 have a structure configured by connecting a different metal material at the connected portions X1, X2 in the same way as in FIG. 2.

In the rotary anode type X-ray tube 20 according to the fourth embodiment, the non-bearing area L5 is in a shorter distance (spatial distance) from the anode target 22 than the bearing areas L1 to L4. In other words, the non-bearing area L5 is located where a time for heat transfer from the anode target 22 is shorter as compared with the bearing areas L1 to L4. Therefore, heat is mainly transferred from the rotary body 23 to the stationary body 28 through the non-bearing area L5. Therefore, the quantity of heat transferred through the bearing areas L1 to L4 is decreased, and the bearing areas L1 to L4 are suppressed from having a temperature increase. As a result, the bearing surface roughness and a change in bearing gap size are decreased, and a stable bearing operation can be maintained.

Besides, according to the structure of the fourth embodiment described above, the stationary body 28 is fixed to the vacuum vessel 21 at two upper and lower portions, and the bearing areas L1 to L4 are disposed on one side as viewed from the anode target 22. In this case, the dynamic pressure type sliding bearing is not disposed on the side of the cathode, so that the outside diameter of the rotary body 23 can be made small, and a withstand voltage can be enhanced.

Besides, the cooling passage 45 is linearly disposed along the tube axis of the stationary body 28, so that heat can be transferred in larger quantity to the cooling medium flowing through the stationary body 28. Thus, the bearing areas L1 to L4 can be suppressed from having a temperature increase without fail, so that the stable bearing operation can be maintained effectively.

Where the rotary anode type X-ray tube 20 has the anode grounded, for example, the vacuum vessel 21 or the anode target 22 is grounded, a metal material is used instead of an insulating material such as ceramics or glass for the cylindrical fixing member 42.

Figure 5:
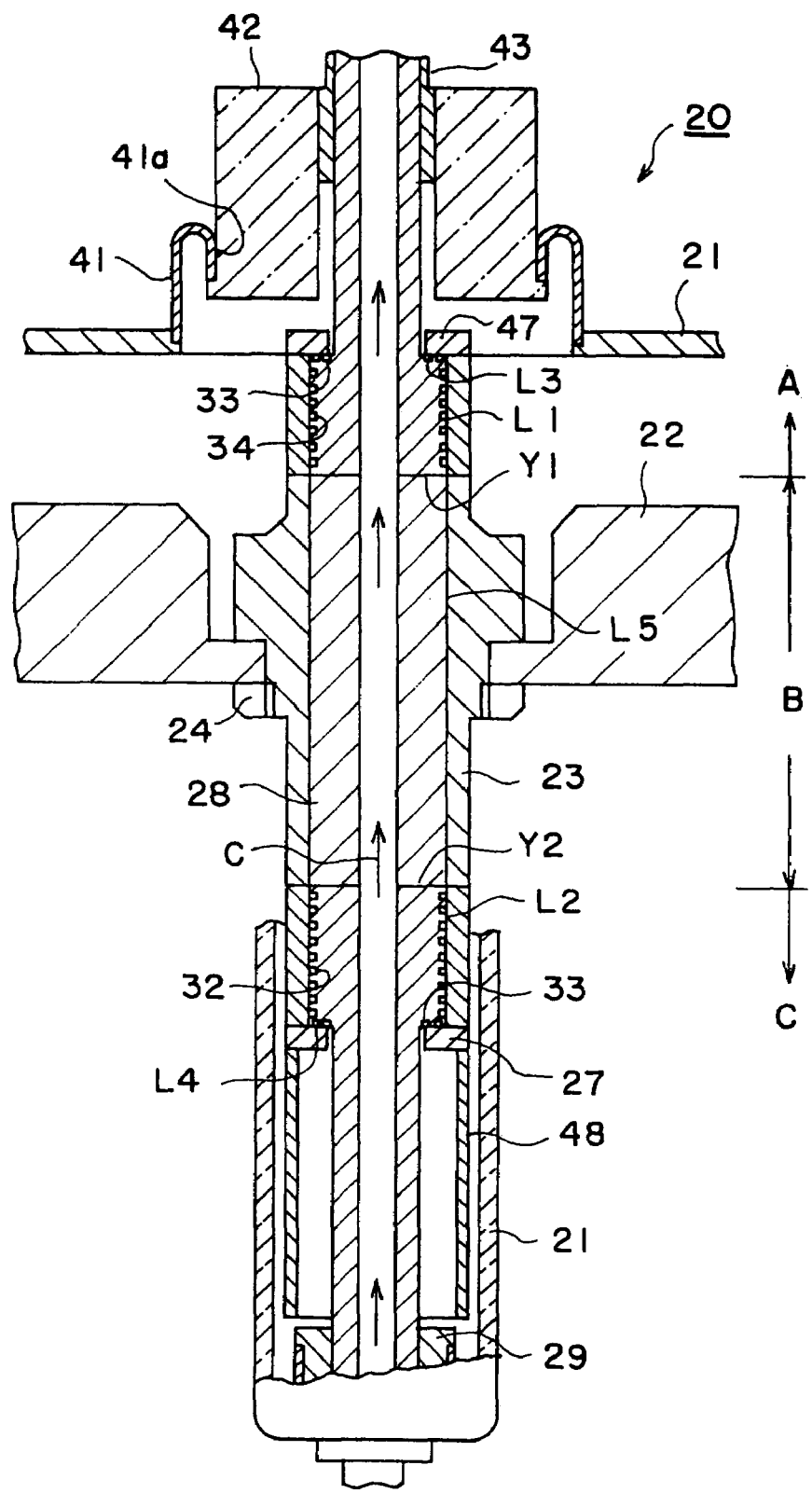
FIG. 5 is a vertical sectional diagram showing a structure of the main part of the rotary anode type X-ray tube according to a fifth embodiment of the first aspect of the invention.

Then, a fifth embodiment of the rotary anode type X-ray tube according to the first aspect of the invention will be described with reference to FIG. 5. In FIG. 5, same numerals are used to denote same parts in FIG. 1 to FIG. 4, and a repeated description of those portions is partially omitted. In the rotary anode type X-ray tube 20 of the fifth embodiment shown in FIG. 5, the rotary body 23 and the stationary body 28 each are divided into three sections of an upper portion A, an intermediate portion B and a lower portion C by two connected portions Y1, Y2 in the tube axial direction. The bottom end opening of the lower portion C of the rotary body 23 is sealed with the thrust ring 27. The top opening of the upper portion A of the rotary body 23 is sealed with a second thrust ring 47.

The rotary body 23 and the stationary body 28 each have the upper portion A and the lower portion C formed of the same metal material, which is different from the one used for the intermediate portion B. Bearing areas L1, L3 are disposed in the upper portion A of the rotary body 23 and the stationary body 28, and bearing areas L2, L4 are disposed in the lower portion C. For example, helical grooves 32 are formed on the outer peripheral surface of the upper portion A and the lower portion C of the stationary body 28, and radial dynamic pressure type sliding bearings are disposed. Helical grooves 33 are formed on an end surface opposed to the thrust ring 47 of the upper portion A of the stationary body 28 and on an end surface opposed to the thrust ring 27 of the lower portion C of the stationary body 28, and thrust dynamic pressure type sliding bearings are disposed.

A high conductive cylindrical rotary body 48, through which an induced current is flown by a stator disposed outside and which generates a rotational torque, is mounted below the thrust ring 27. In this structure, the anode target 22 is directly connected to the rotary body 23 of the non-bearing area L5.

In the rotary anode type X-ray tube 20 of the fifth embodiment, the non-bearing area L5 is in a shorter distance (spatial distance) from the anode target 22 as compared with the bearing areas L1 to L4, so that the bearing areas L1 to L4 are suppressed from having a temperature increase. As a result, the bearing surface roughness and a change in bearing gap size are decreased, and a stable bearing operation can be maintained. Besides, the bearing area is separately disposed on either side of the anode target 22, so that the upper and lower bearing areas have an applied load in good balance, and the bearing stability is improved.

Subsequently, a sixth embodiment of the rotary anode type X-ray tube according to the first aspect of the invention will be described with reference to FIG. 6. In the rotary anode type X-ray tube 20 of the sixth embodiment shown in FIG. 6, the anode target 22 is disposed together with the cathode for generating an electron beam, and the like in the vacuum vessel (not shown). The anode target 22 is coupled to a rotary shaft 52 which is connected to a rotary body 51.

The rotary shaft 52 is partly (e.g., a lower portion) formed to have a cylinder shape to decrease heat transfer in cross section.

The rotary body 51 configures a rotating portion of the rotating mechanism 53 which rotatably supports the anode target 22. The rotary body 51 has an intermediate cylinder 511 which is connected to the bottom end outer peripheral surface of the rotary shaft 52, an inner cylinder 512 which has its top end connected to the bottom end inner peripheral surface of the rotary shaft 51 and its bottom end connected to the inside of the intermediate cylinder 511, and an outer cylinder 513 which is connected to the outside of the intermediate cylinder 511. The outer cylinder 513 is formed of copper or the like, and the intermediate cylinder 511 is formed of a ferromagnetic material such as an iron-based alloy.

The inner cylinder 512 of the rotary body 51 is comprised of a large-diameter section 512a which configures a lower portion and has a large outer diameter and a small-diameter section 512b which has a smaller outer diameter than the large-diameter section 512a and configures an upper portion. The outer peripheral surface of the small-diameter section 512b is connected to the inner peripheral surface of the rotary shaft 52, and the outer peripheral surface of the large-diameter section 512a is partly connected to the inside of the intermediate cylinder 511. The bottom end opening of the inner cylinder 512 is sealed with the thrust ring 27. And, a stationary body 54 is fitted to the inside of the inner cylinder 512 to configure the rotating mechanism 53.

The stationary body 54 configures a stationary portion of the rotating mechanism 53 which rotatably supports the anode target 22, and its bottom end passes through the thrust ring 27 to extend below it. The stationary body 54 is comprised of a large-diameter section 541 which is fitted to the large-diameter section 512a of the inner cylinder 512 of the rotary body 51, a first small-diameter section 542 which is fitted to the small-diameter section 512b of the inner cylinder 512 and a second small-diameter section 543 which passes through the thrust ring 27 to extend below it. The hole 30 is formed in the stationary body 54 along the tube axis, and the pipe 31 is inserted into the hole 30. Thus, a cooling medium passage is formed as indicated by arrows C.

On the fitted portion between the inner cylinder 512 of the rotary body 51 and the stationary body 54, a dynamic pressure type sliding bearing is disposed in a portion where the inner cylinder 512 and the stationary body 54 are mutually opposed with a gap of a prescribed size between them. For example, radial dynamic pressure type sliding bearings are disposed on two separate portions (areas L1, L2) in the tube axial direction of the outer peripheral surface of the stationary body 54. And, thrust dynamic pressure type sliding bearings are disposed in areas L3, L4 where upper and lower step surfaces of the stationary body 54 and the rotary body 51 are mutually opposed.

Figure 7:
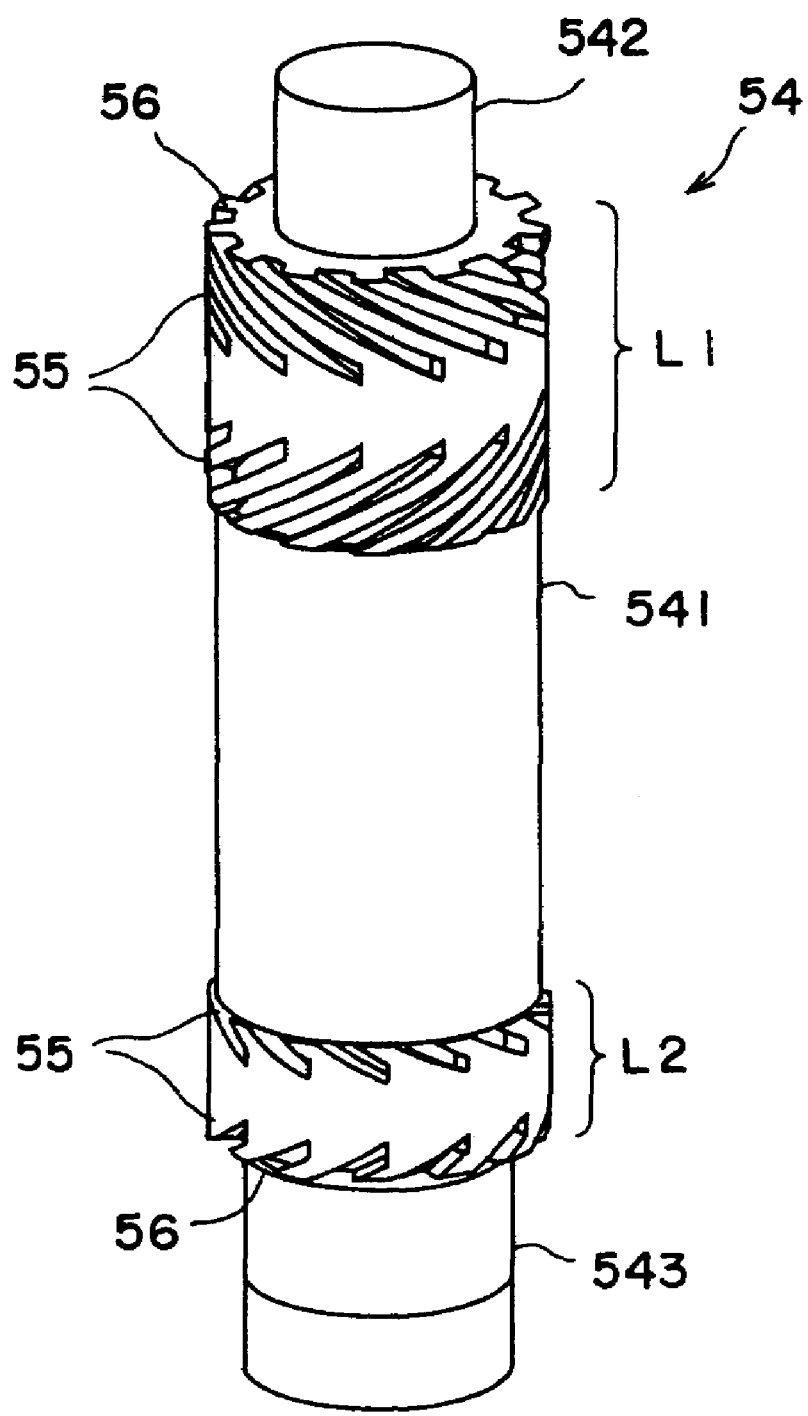
FIG. 7 is a perspective diagram showing a stationary body used for the rotary anode type X-ray tube shown in FIG. 6.

The individual bearing areas L1 to L4 have herringbone pattern helical grooves formed on the bearing surface, and the dynamic pressure type sliding bearing is comprised of the helical grooves and a liquid metal lubricant filled in the gap between the rotary body 51 and the stationary body 54. FIG. 7 is a diagram showing the stationary body 54. It is shown in FIG. 7 that helical grooves 55, 56 are formed in the individual bearing areas L1 to L4 of the stationary body 54.

In the fitted portion between the rotary body 51 and the stationary body 54, an area L5 held between the two bearing areas L1, L2 formed on the outer peripheral surface of the stationary body 54, an area L6 held between the outer peripheral surface of the small-diameter section 542 of the stationary body 54 and the inner peripheral surface of small-diameter section 512 of the inner cylinder 512, and an area L7 held between the top end surface of the stationary body 54 and the upper bottom of the inner cylinder 512 are formed to have a gap between the inner cylinder 512 and the stationary body 54 to be larger than the individual bearing areas L1 to L4 and become non-bearing areas which substantially do not operate as a bearing.

The gaps of the non-bearing areas L5 to L7 and the gaps of the bearing areas L1 to L4 are communicated, and the liquid metal lubricant is also filled in the gaps of the non-bearing areas L5 to L7. In FIG. 6, the individual gaps are exaggerated for purpose of illustration, and the stationary body 54 in the bearing areas L1, L2 actually has a diameter of, for example, 50 mm and a gap of, for example, 10 to 50 μm. The gaps of the bearing areas L3, L4 are also determined to be 10 to 50 μm. The gaps of the non-bearing areas L6, L7 are determined to fall in a range of, for example, 30 to 500 μm.

In the rotary anode type X-ray tube 20 having the above-described structure, a rotational torque is generated in the rotary body 51 of the rotating mechanism 53 by a rotating magnetic field produced by a stator coil (not shown) disposed outside of the vacuum vessel. This rotational torque is transferred to the anode target 22 to rotate the anode target 22. In this state, an electron beam is irradiated from the cathode (not shown) to the anode target 22, which in turn emits X-rays.

When the rotary anode type X-ray tube 20 starts to operate, the temperature of the anode target 22 is increased by radiation of the electron beam. Heat of the anode target 22 is dissipated by radiation but partly transferred from the anode target 22 to the rotary shaft 52, from the rotary shaft 52 to the rotary body 51 and from the rotary body 51 to the stationary body 54. Then, the heat is externally dissipated through the cooling medium flowing through the cooling passage. At this time, the rotary body 51 is partly connected to the rotary shaft 52 in the non-bearing area L6, so that its spatial and thermal distance (route) to the anode target 22 is shorter as compared with the parts of the rotary body 51 in the bearing areas L1 to L4.

Therefore, the heat of the anode target 22 is mostly transferred to the stationary body 54 through the connected portion between the rotary body 51 and the rotary shaft 52 and the non-bearing area L6 to suppress the bearing areas L1 to L4 from having a temperature increase. And, the connected portion between the rotary body 51 and the rotary shaft 52 in the non-bearing area L6 has a shorter distance from the anode target 22 and is closer to the center of gravity of the rotating portion as compared with the bearing areas L1 to L4. Thus, the connection can be made at a mechanically stable part.

In the above-described structure, the connected portion between the rotary shaft 52 and the intermediate cylinder 511 of the rotary body 51 has a longer distance from the anode target 22 as compared with the rotary body 51 of the non-bearing area L6. Therefore, the connected portion between the rotary shaft 51 and the intermediate cylinder 511 does not become the primary route for the heat from the anode target 22. Thus, the quantity of heat flowing to the stationary body 54 through the connected portion between the intermediate cylinder 511 and the inner cylinder 512 can be suppressed. And, the bearing areas L1 to L4 are suppressed from having a temperature increase and prevented from having deterioration in mechanical strength.

A heat transfer path from the anode target 22 to the stationary body 54 can be made short and a deformation of the anode can be reduced by suppressing the bearing areas L1 to L4 from having a temperature increase. Thus, adoption of a very heavy anode target 22 is facilitated. Besides, the connected portion between the rotary shaft 52 and the intermediate cylinder 511 can be made closer to the anode target 22, for example, the connected portion can be disposed close to the position of the center of gravity of the mechanically stable rotating anode portion. And, for connection between the rotary shaft 52 and the intermediate cylinder 511, a brazing material having a low melting temperature and having good workability can be used, and a cost can be reduced as compared with the use of a high melting-point metal brazing material. A blackening process on the outer surface of the rotary body 51 is not necessarily required, a withstand voltage is prevented from lowering, and a cost is also reduced.

Figure 6:
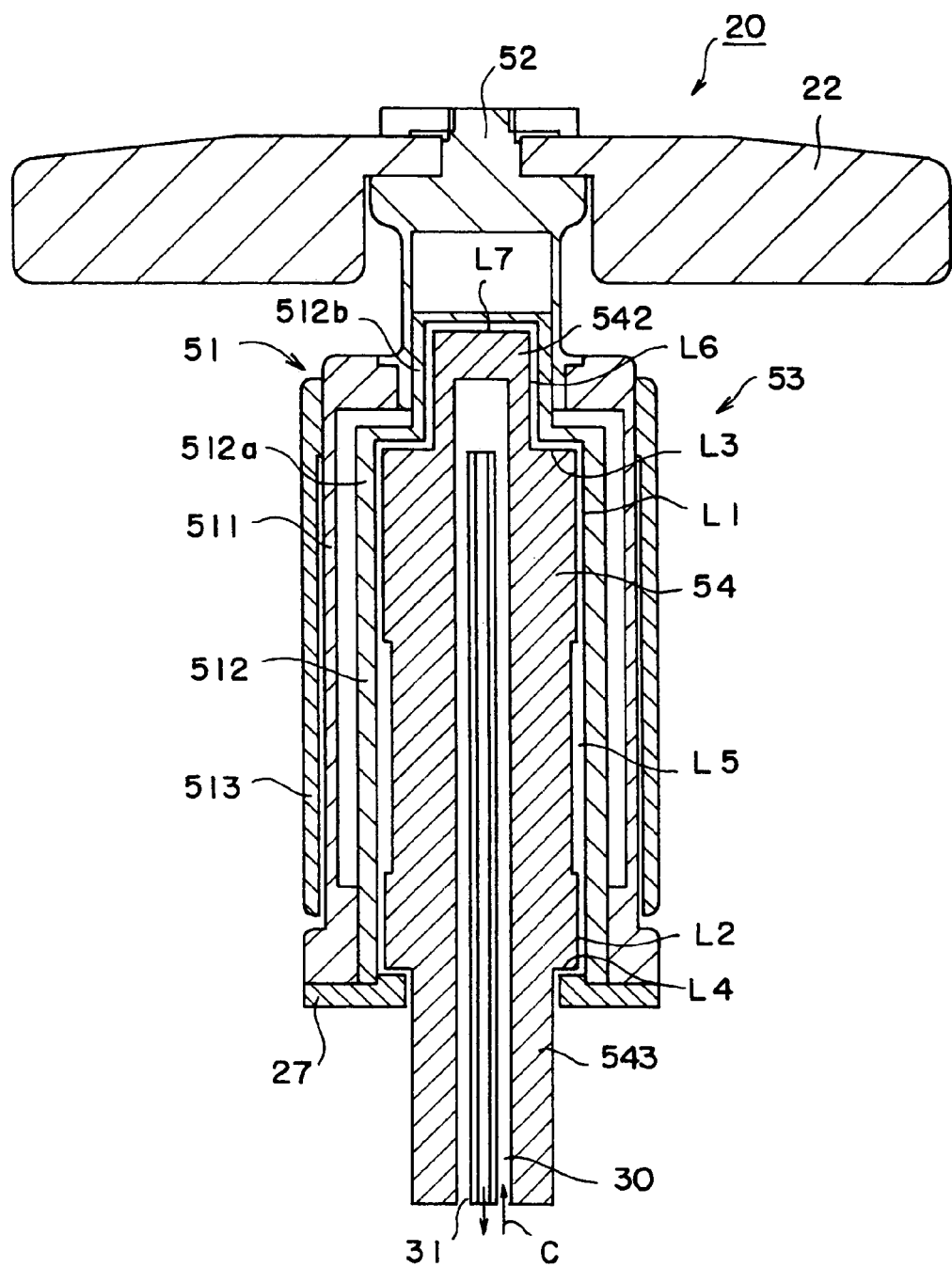
FIG. 6 is a vertical sectional diagram showing a structure of the main part of the rotary anode type X-ray tube according to a sixth embodiment of the first aspect of the invention.

In the rotary anode type X-ray tube 20 shown in FIG. 6, the cooling medium passage in the stationary body 54 is formed in an area where the rotary shaft 52 and the inner cylinder 512 are connected, and cooling is made by an impingement jet method which blows a cooling medium to the bottom of the cooling medium passage. Therefore, the heat transfer efficiency in proximity to the main heat transfer path is improved, and good heat emission can be made. In this case, the cooling capacity of the cooling medium flowing through the stationary body 54 is allowed to be low, and the cooling system can be made compact. The conditions for the used materials are relieved and a material selection range is expanded because a temperature increase is small.

Figure 21:
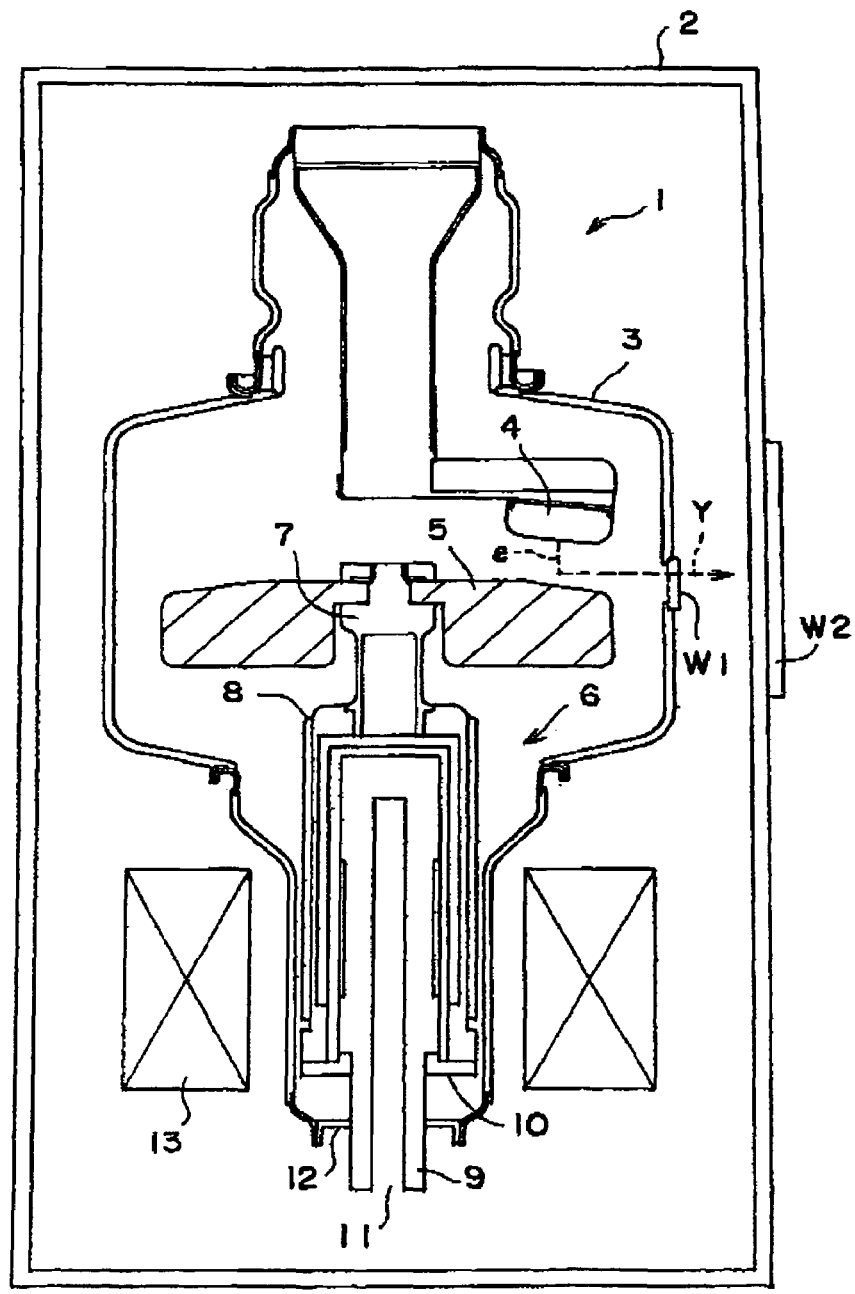
FIG. 21 is a diagram showing a brief structure of a conventional rotary anode type X-ray tube.
Figure 22:
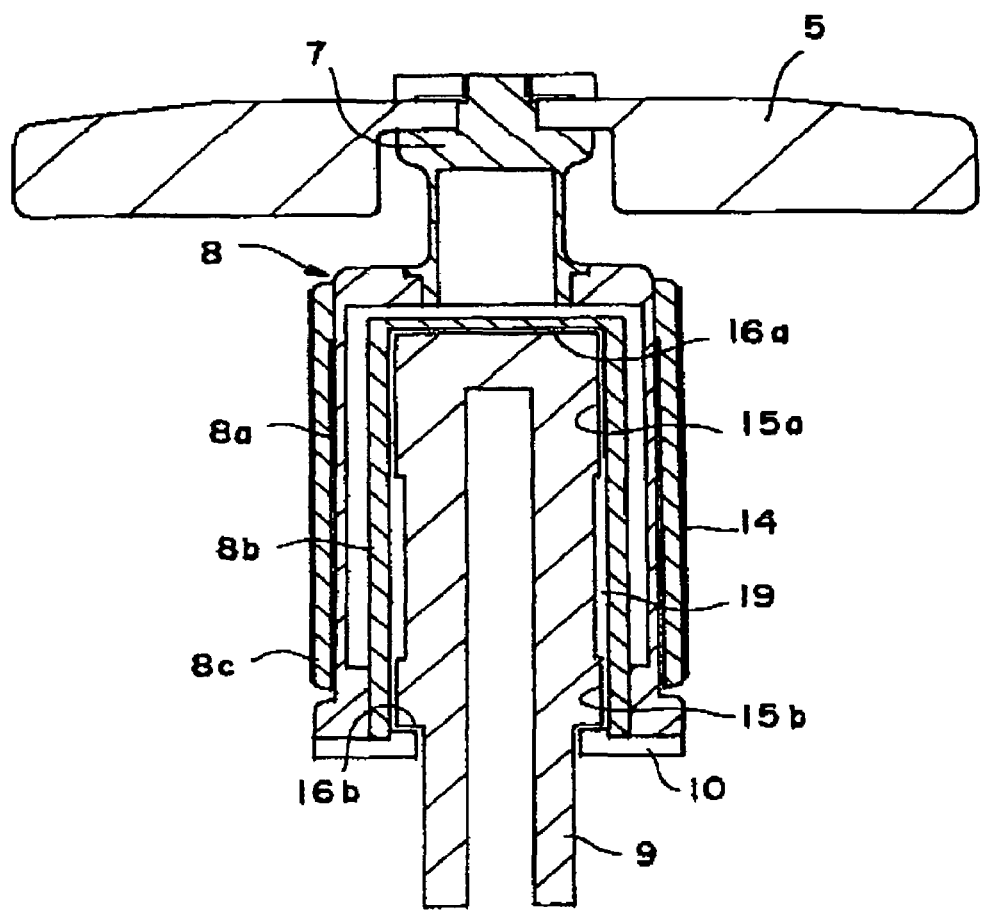
FIG. 22 is a sectional diagram showing the rotating anode portion taken from the rotary anode type X-ray tube shown in FIG. 21.
Figure 23:
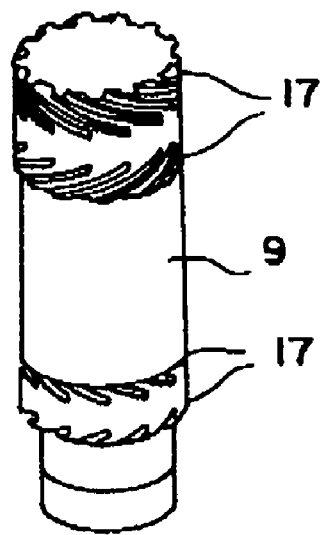
FIG. 23 is a perspective diagram showing a stationary body of the rotating anode portion shown in FIG. 22.
Figure 24:
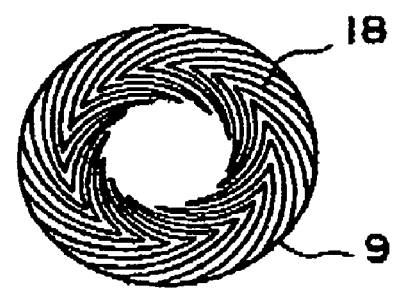
FIG. 24 is a diagram showing the top end surface of the stationary body shown in FIG. 22.

For example, when calculations are made on the structure shown in FIG. 6 and the conventional structure shown in FIG. 21 and FIG. 22 under conditions that the material for the anode structure is same, average heat input of the anode target is 5 kW, the cooling medium is a common insulating oil and a cooling flow rate is in the same range of 8 to 9 L/min, the structure of FIG. 6 has a temperature drop of about 100 to 150° C. at the end of the bearing side of the rotary shaft 52 and a temperature drop of about 150° C. in average of the outer rotary body 513 as compared with the conventional structure shown in FIG. 21 and FIG. 22.

Figure 8:
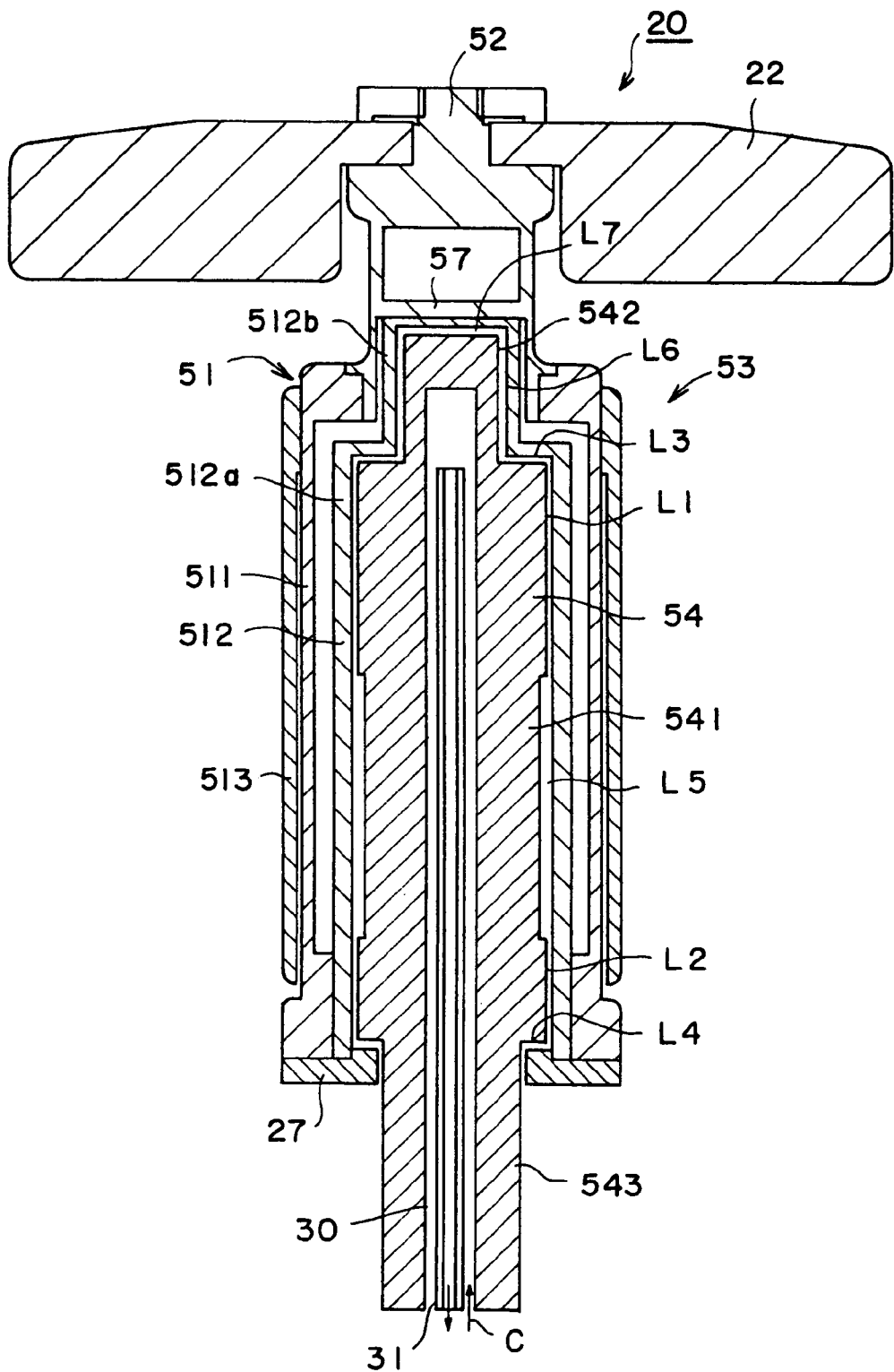
FIG. 8 is a vertical sectional diagram showing a structure of the main part of the rotary anode type X-ray tube according to a seventh embodiment of the first aspect of the invention.

Then, a seventh embodiment of the rotary anode type X-ray tube according to the first aspect of the invention will be described with reference to FIG. 8. In FIG. 8, same numerals are used to denote same parts in FIG. 6, and a repeated description of those portions is partially omitted. In the rotary anode type X-ray tube 20 of the seventh embodiment shown in FIG. 8, a blocking wall 57 for closing the inner space of the rotary shaft 52 in a direction orthogonal to the tube axis is disposed in the cylindrical portion of the rotary shaft 52. The inner cylinder 512 of the rotary body 51 is connected to the surface of the blocking wall 57 on the side of the stationary body 54 to determine this connected portion as a heat transfer area. In this case, the non-bearing area L7 forms a main heat transfer path for the heat from the anode target 22.

In the above-described embodiments, the distance from the anode target to the rotary body portion of the non-bearing area is shorter than the distance from the anode target to the rotary body portion of the bearing area. In this structure, the heat transferred from the rotary body to the stationary body through the non-bearing area is increased to suppress the bearing area from having a temperature increase. When the coupled portion between the anode target and the rotary body of the non-bearing area and the coupled portion between the anode target and the rotary body of the bearing area have a different shape, material or cooling condition, the same effect can be obtained by having a shorter thermal distance for the former coupled portion than for the latter coupled portion.

For example, the coupled portion between the anode target and the rotary body portion facing the non-bearing area is formed to have a structure or formed of a material so as to have a faster heat transfer speed. Otherwise, it is formed to have a structure or formed of a material so that the rotary body portion facing the non-bearing area has a larger quantity of heat transfer per unit time or unit area. Besides, it is formed to have a structure or formed of a material so that the rotary body portion facing the non-bearing area has a larger quantity of heat transfer per unit time and unit area. In the above cases, the heat transferred through the non-bearing area becomes large when the heat is transferred from the rotary body to the stationary body, and the bearing area is suppressed from having a temperature increase.

Helical grooves can also be formed in the surface of the rotary body or the stationary body of the non-bearing area. When the helical grooves are formed in the non-bearing area, the helical grooves function to keep the liquid metal lubricant in the gap when the rotary body rotates, and the heat is transferred favorably from the rotary body to the stationary body through the non-bearing area. According to the structure of each of the above-described embodiments, the rotary anode type X-ray tube capable of relatively increasing the average value of power input to the anode target and maintaining a stable bearing operating capacity for a long time can be obtained. Besides, the bearing portion is prevented from having galling at the start or stop of rotation, and the bearing operation is stabilized.

Figure 9:
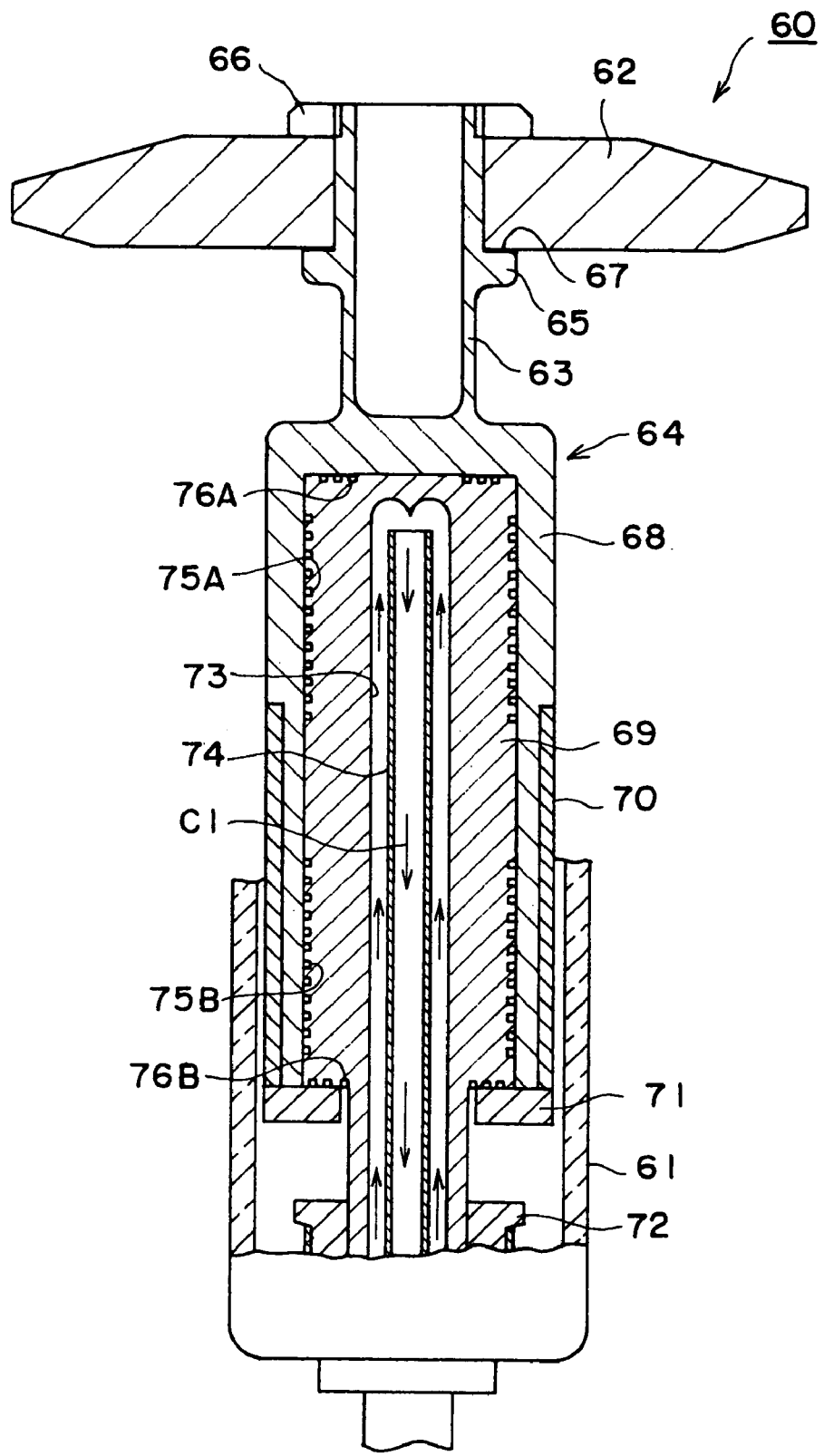
FIG. 9 is a vertical sectional diagram showing a structure of the main part of the rotary anode type X-ray tube according to a first embodiment of a second aspect of the invention.

Embodiments of the rotary anode type X-ray tube according to a second aspect of the invention will be described. FIG. 9 is a vertical sectional diagram showing a structure of the main part of the rotary anode type X-ray tube according to a first embodiment of the second aspect of the invention. A rotary anode type X-ray tube 60 shown in FIG. 9 has, for example, a glass vacuum vessel 61. An anode target 62 is disposed in the vacuum vessel 61. The anode target 62 is connected to a connecting portion 63 and also connected to a rotating mechanism 64 through the connecting portion 63.

The connecting portion 63 is formed to have at least a cylindrical portion, namely a heat resistant structure having a small heat transfer area, in order to suppress the heat transferred from the anode target 62 to the rotating mechanism 64. An externally protruded ring-shape stepped portion 65 is formed on the outer peripheral surface of the connecting portion 63. The connecting portion 63 passes through the center through hole of the anode target 62 and has a nut 66 engaged with its top end. The anode target 62 is fixed between the stepped portion 65 and the nut 66. Besides, the anode target 62 and the stepped portion 65 are connected by diffusion welding with, for example, a titanium foil 67 held between them.

The rotating mechanism 64 is mainly comprised of a bottomed cylindrical rotary body 68 and a stationary body 69 which is fitted into the rotary body 68. The rotary body 68 is integrally formed with the connecting portion 63. The bottom of the cylindrical rotary body 68 is integrally connected to the connecting portion 63. A cylindrical copper member 70 is connected to the outer peripheral surface of the rotary body 68. The bottom end opening of the rotary body 68 is sealed with a thrust ring 71. The thrust ring 71 is fixed to the rotary body 68 to form a rotating portion of the rotating mechanism 64 together with the rotary body 68 and the like.

The stationary body 69 passes through the thrust ring 71 and its bottom end is connected air-tight to the glass portion of the vacuum vessel 61 through a sealing member 72. A long hole 73 is formed in the stationary body 69 along the tube axis, and a pipe 74 is disposed in the hole 73. The hole 73 and the pipe 74 in the stationary body 69 have their bottom ends open to the outside of the vacuum vessel 61 and form a cooling medium passage. The cooling medium (e.g., an insulating oil) flows from the outside of the vacuum vessel 61 to the upper portion along the exterior of the pipe 74, enters the pipe 74 at the top end to flow downward through it and is discharged from the vacuum vessel 61 as indicated by arrows C1.

Radial dynamic pressure type sliding bearings 75A, 75B are disposed in the fitted portion between the rotary body 68 and the stationary body 69. The dynamic pressure type sliding bearings 75A, 75B are comprised of herringbone pattern helical grooves formed in the outer peripheral surface of the stationary body 69 and a liquid metal lubricant to be supplied to the helical grooves at the time of operation. And, thrust dynamic pressure type sliding bearings 76A, 76B are disposed in the opposed portion between the top end surface of the stationary body 69 and the rotary body 68 and the opposed portion between the bottom end surface of the stationary body 69 and the thrust ring 71.

The dynamic pressure type sliding bearings 76A, 76B are comprised of herringbone pattern helical grooves each formed in the top end surface and bottom end surface of the stationary body 69 and the liquid metal lubricant to be supplied to the helical grooves at the time of operation. In the bearing areas where the dynamic pressure type sliding bearings 75A, 75B, 76A, 76B are formed, the gap (bearing gap) between the rotary body 68 or the thrust ring 71 and the stationary body 69 is determined to fall in the range of about 10 to 30 $\mu$m.

In the rotary anode type X-ray tube 60 configured as described above, a rotational torque is generated in the rotary body 68 of the rotating mechanism 64 by a rotating magnetic field generated by a stator coil (not shown) disposed outside of the vacuum vessel 61. This rotational torque is transferred to the anode target 62 through the connecting portion 63 to rotate the anode target 62. In this state, the electron beam is irradiated to the anode target 62, which in turn emits X-rays.

When the rotary anode type X-ray tube 60 starts to operate, the anode target 62 has a temperature increase by the irradiation of the electron beam. The heat of the anode target 62 is dissipated by radiation and partly transferred from the anode target 62 to the rotary body 68 through the connecting portion 63. The heat transferred to the rotary body 68 is further transferred to the stationary body 69 and externally dissipated through the cooling medium flowing through the stationary body 69. At this time, when the temperature of the bearing area is kept at about 350° C. or below, a reaction between the material configuring the bearing surface and the liquid metal lubricant is suppressed, and the bearing surface roughness and a changed in bearing gap size can be prevented.

In the structure described above, the anode target 62 and the connecting portion 63 are mutually connected by metal bonding by diffusion welding, and the rotary body 68 and the connecting portion 63 are integrally connected. In this case, all the heat transfer routes from the anode target 62 to the rotary body 68 are metallographically connected. As a result, there is no simple mechanically contacted part of the metals in the heat transfer routes, and variations in heat resistance value of the heat transfer routes can be prevented.

According to the first embodiment shown in FIG. 9, the rotary body 68, the stationary body 69 and the thrust ring 71 configuring the rotating mechanism 64 are formed of a material such as molybdenum or a molybdenum alloy. Such a material is fabricated relatively easily, and the rotating mechanism 64 can be configured inexpensively. Instead of such a material, tungsten, a tungsten alloy, tantalum or a tantalum alloy can be used. They have an advantage that they are hardly corroded by the liquid metal lubricant.

Even when a material such as molybdenum is used, the heat-resistant coating of the high melting-point substance as described in the embodiments according to the first aspect of the invention can be formed on the surface of at least one of the rotary body 68 and the stationary body 69 in the heat transfer area where heat is transferred from the rotary body 68 to the stationary body 69, so that the heat resistant temperature of the fitted surface forming the heat transfer area can be increased. Thus, the cooling capacity of the anode target 62 can be improved. An iron-based material mainly consisting of iron may be used to form a structure that the above-described heat-resistant coating is formed on the bearing surface and also on its fitted surface.

Here, a method for diffusion welding of the anode target 62 and the connecting portion 63 will be described. First, the titanium foil 67 having a thickness of about 10 $\mu$m is disposed as a diffusion promoter between the anode target 62 and the stepped portion 65 of the connecting portion 63. The nut 66 is screwed on the top end of the connecting portion 63 to fix the anode target 62 between the stepped portion 65 and the nut 66. At this time, the nut 66 is desirably tightened so that a tightening pressure applied to the titanium foil 67 becomes about 30 MPa or more.

Then, an assembly having the anode target 62, the connecting portion 63 and the rotary body 68 connected is disposed on a mount base in a quartz bell jar. And, an electric current is passed to a high-frequency coil disposed outside of the quartz bell jar while evacuating the quartz bell jar to heat the anode target 62 to about 1300° C. At this time, the heat of the anode target 62 escapes to the mount base through the connecting portion 63 and the rotary body 68 to cause a temperature gradient in the assembly. The temperature near the interface between the anode target 62 and the stepped portion 65 with the titanium foil 67 held therebetween reaches about 1100° C. When this temperature is maintained for about 30 minutes, mutual diffusion of the titanium elements of the titanium foil 67 and the molybdenum elements of the anode target 62 and the connecting portion 63 proceeds to bond the anode target 62 and the connecting portion 63.

After bonding, the heating is terminated, and the assembly is taken out after cooling. Then, the assembly is corrected its balance, the stationary body 69 is fitted into the rotary body 68, and the thrust ring 71 and the like are also fitted to configure a structure having the anode target 62 and the rotating mechanism 64 integrally formed.

Figure 10:
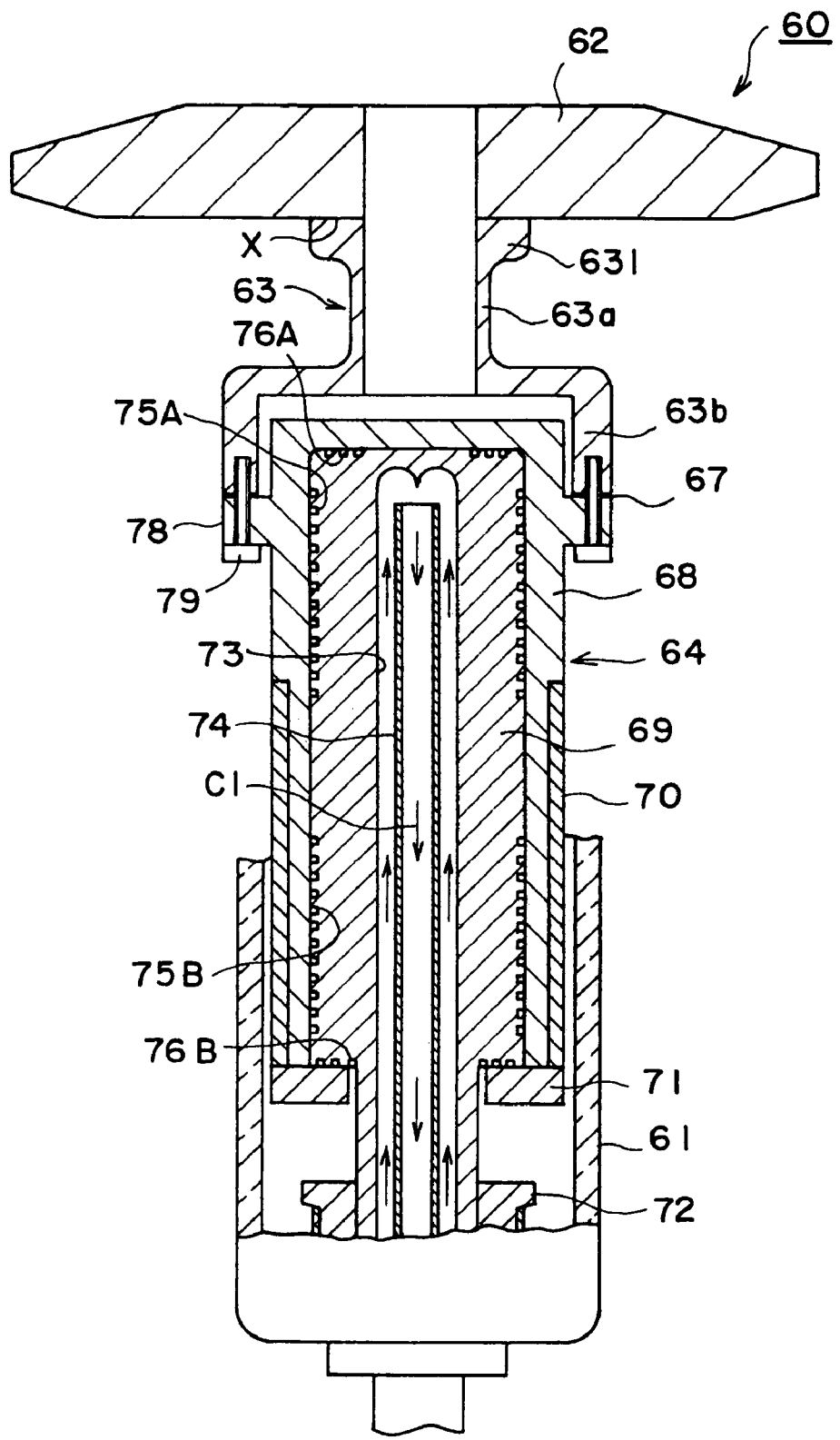
FIG. 10 is a vertical sectional diagram showing a structure of the main part of the rotary anode type X-ray tube according to a second embodiment of the second aspect of the invention.

Then, a second embodiment of the rotary anode type X-ray tube according to the second aspect of the invention will be described with reference to FIG. 10. In FIG. 10, same numerals are used to denote same parts in FIG. 9, and a repeated description of those portions is partially omitted. In the rotary anode type X-ray tube 60 according to the second embodiment shown in FIG. 10, the connecting portion 63 is comprised of a first cylindrical portion 63a and a second cylindrical portion 63b of which inner diameter and outer diameter are larger than those of the first cylindrical portion 63a. The first cylindrical portion 63a and the second cylindrical portion 63b of the connecting portion 63 are integrally formed but are separately configured from a bottomed cylindrical rotary body 68.

An externally protruded annular projection 631 is formed on the first cylindrical portion 63a on the side of the anode target 22. The anode target 62 and the annular projection 631 of the connecting portion 63 are metal-bonded at a connected portion X by friction welding. The anode target 62 and the connecting portion 63 which are integrally connected metallographically by the friction welding are finished as one part.

And, an annular projection 78 is formed on the outer peripheral surface of the rotary body 68. The annular bottom end surface of the second cylindrical portion 63b of the connecting portion 63 and the annular top surface of the projection 78 of the rotary body 68 are bonded by diffusion welding with the titanium foil 67 held therebetween. The connected portion between the second cylindrical portion 63b and the projection 78 of the rotary body 68 is reinforced with fixing screws 79 extending in the tube axial direction.

For diffusion welding the connecting portion 63 and the rotary body 68, the titanium foil 67 having a thickness of about 10 μm is held as a diffusion promoter between the annular bottom surface of the second cylindrical portion 63b of the connecting portion 63 and the annular top surface of the projection 78 of the rotary body 68 and fixed with the plural fixing screws 79. At this time, the fixing screws 79 are tightened to apply a tightening pressure of about 30 MPa or higher to the titanium foil 67.

Then, an assembly having the anode target 62, the connecting portion 63 and the rotary body 68 connected is placed on the mount base in the quartz bell jar. An electric current is passed to a high-frequency coil disposed outside of the quartz bell jar to heat the anode target 62 to about 1300° C. while vacuuming the quartz bell jar. Heat of the anode target 62 escapes to the mount base through the connecting portion 63 and the rotary body 68 to produce a temperature gradient in the assembly.

At this time, the temperature near the interface between the connecting portion 63 and the rotary body 68 with the titanium foil 67 held therebetween reaches about 1000° C. This temperature is maintained for about one hour. By this thermal treatment, mutual diffusion of the titanium elements of the titanium foil 67 and the molybdenum elements of the anode target 62 and the connecting portion 63 proceeds to bond the connecting portion 63 and the rotary body 68.

After the bonding is completed, the heating is terminated, and the assembly is taken out after cooling. Then, the assembly is corrected its balance, the stationary body 69 is fitted into the rotary body 68, and the thrust ring 71 is fitted to configure an integral structure of the anode target 62 and the rotating mechanism 64.

According to the second embodiment shown in FIG. 10, the anode target 62 and the connecting portion 63 are bonded by friction welding, and the rotary body 68 and the connecting portion 63 are bonded by diffusion welding. Thus, the heat transfer routes from the anode target 62 to the rotary body 68 are integrally configured metallographically. Therefore, there is no simple contact of metal surfaces in the heat transfer routes, and variations in heat resistance value of the heat transfer routes can be prevented.

Figure 11:
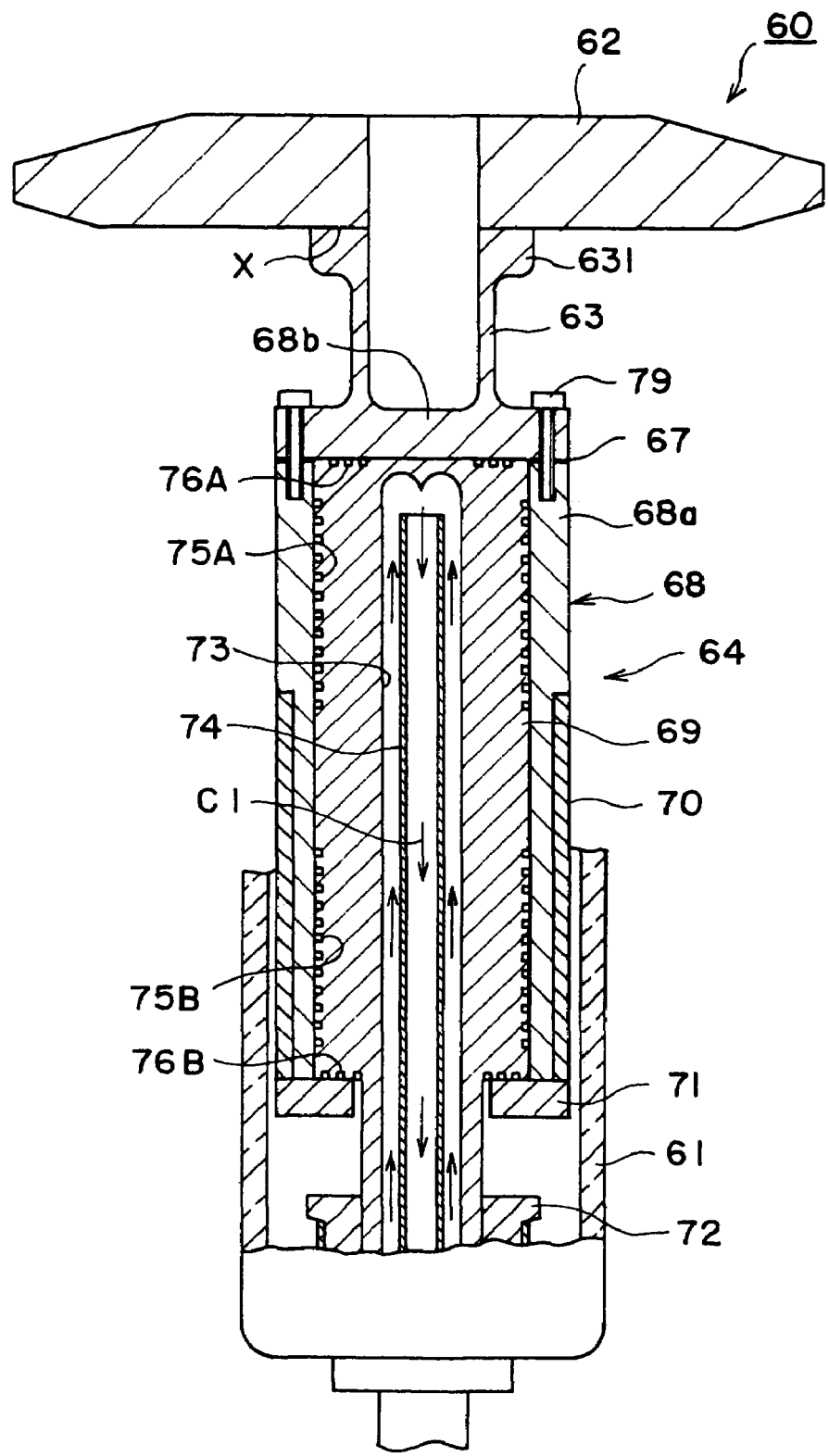
FIG. 11 is a vertical sectional diagram showing a structure of the main part of the rotary anode type X-ray tube according to a third embodiment of the second aspect of the invention.

A third embodiment of the rotary anode type X-ray tube according to the second aspect of the invention will be described with reference to FIG. 11. In FIG. 11, same numerals are used to denote same parts in FIG. 9 and FIG. 10, and a repeated description of those portions is partially omitted. In the rotary anode type X-ray tube 60 of the third embodiment shown in FIG. 11, a cylindrical portion 68a and a bottom plate portion 68b of a bottomed cylindrical rotary body 68 are separately produced. The bottom plate portion 68b is integrally formed with the connecting portion 63.

The anode target 62 and the connecting portion 63 are integrally connected metallographically by friction welding in the same way as in the second embodiment shown in FIG. 10. The bottom plate portion 68b and the cylindrical portion 68a of the rotary body 68 are integrally connected metallographically by diffusion welding using the titanium foil 67. The connected portion between the bottom plate portion 68b and the cylindrical portion 68a is reinforced with fixing screws 79.

In the above-described structure, the heat of the anode target 62 is transferred from the connecting portion 63 to the bottom plate portion 68b and transferred from, for example, the center of the bottom plate portion 68b to the stationary body 69. And, the heat resistance of the connected portion between the cylindrical portion 68a and the bottom plate portion 68b of the rotary body 68 does not have a large effect on the heat radiation properties. Accordingly, only the fixing screws 79 can be used for fixing, and the diffusion welding can be omitted.

In the third embodiment shown in FIG. 11, the anode target 62 and the connecting portion 63 are connected by metal bonding, and the rotary body 68 and the connecting portion 63 are connected by integral forming. Thus, the heat transfer routes from the anode target 62 to the bottom plate portion 68b of the rotary body 68 is integrally formed metallographically. Therefore, there is no simple contact of metal surfaces in the heat transfer routes, and variations in heat resistance value of the heat transfer routes can be prevented.

Figure 12:
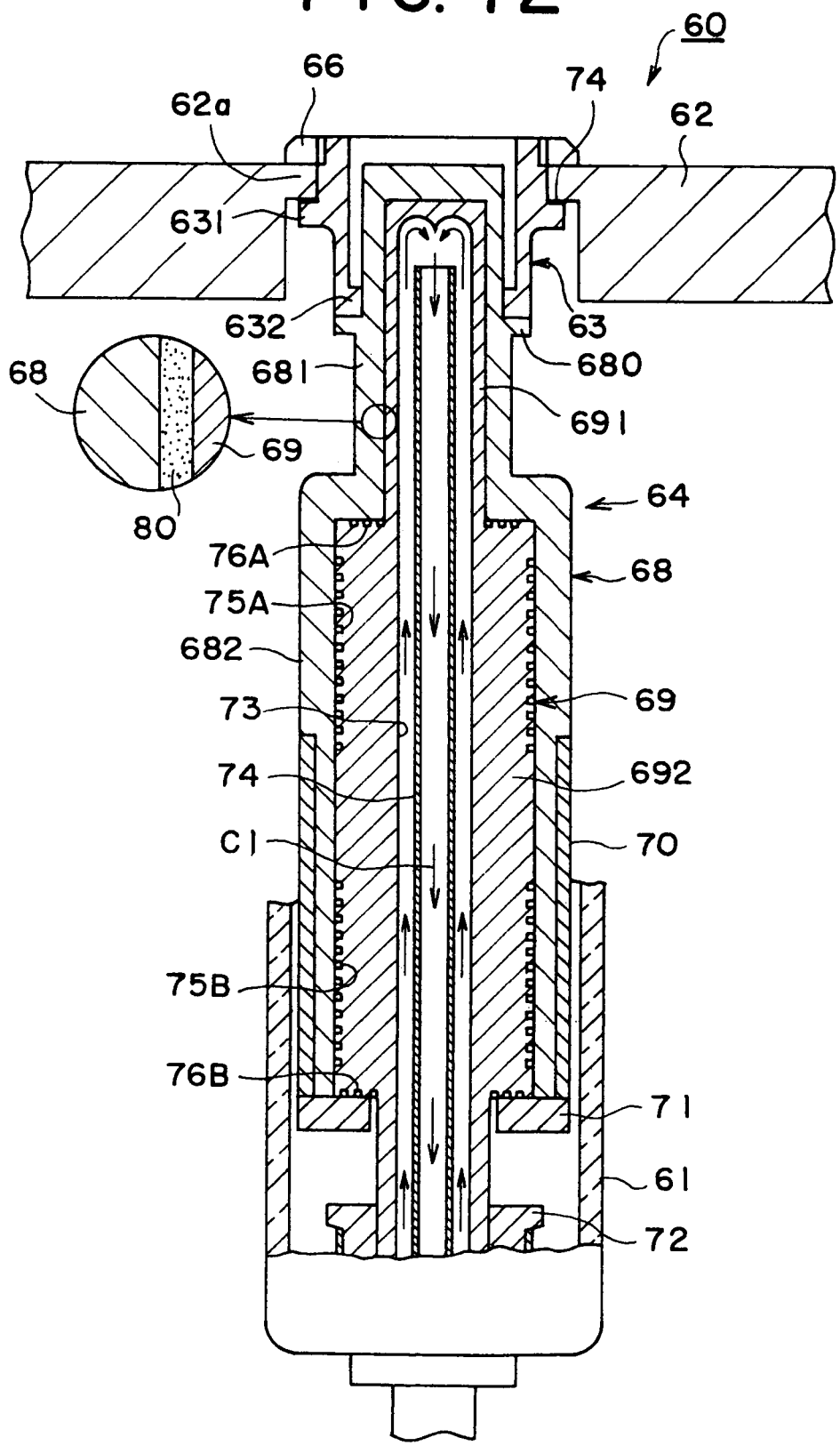
FIG. 12 is a vertical sectional diagram showing a structure of the main part of the rotary anode type X-ray tube according to a fourth embodiment of the second aspect of the invention.

Then, a fourth embodiment of the rotary anode type X-ray tube according to the second aspect of the invention will be described with reference to FIG. 12. In FIG. 12, same numerals are used to denote same parts in FIG. 9 to FIG. 11, and a repeated description of those portions is partially omitted. In the rotary anode type X-ray tube 60 of the fourth embodiment shown in FIG. 12, a thin portion 62a having a small thickness is formed on an edge of the through hole of the anode target 62. An externally protruded annular stepped portion 631 is formed on the outer peripheral surface of the connecting portion 63, and an internally protruded annular projection 632 is formed on the bottom end portion.

The rotary body 68 is comprised of a small-diameter section 681 having a small inner diameter and a large-diameter section 682 which has a larger inner diameter and is integrally formed with the small-diameter section 681. Besides, an annular projection 680 is formed on the outer peripheral surface. The stationary body 69 is comprised of a small-diameter section 691 having a small outer diameter and a large diameter section 692 which has a larger outer diameter and is integrally formed with the small diameter section 691. The small-diameter section 691 and the large-diameter section 692 of the stationary body 69 are fitted into the small-diameter section 681 and the large-diameter section 682 of the rotary body 68.

In the above-described structure, the anode target 62 has its thin portion 62a fixed between a nut 66 and a stepped portion 631, and at the same time, the thin portion 62a and the stepped portion 631 are connected by diffusion welding using a titanium foil 74. And, the connected portion between the annular projection 632 of the connecting portion 63 and the annular projection 680 of the rotary body 68 is brazed.

According to the fourth embodiment shown in FIG. 12, the gap where the small-diameter section 681 of the rotary body 68 and the small-diameter section 691 of the stationary body 69 are opposed is in a range of, for example, 30 to 500 µm, which is larger than the gap for the bearing areas where the dynamic pressure type sliding bearings 75A, 75B. 76A, 76B are formed. These areas having a large gap form a non-bearing area which substantially does not function as a bearing. A liquid metal lubricant is also supplied to the non-bearing area in the same way as to the bearing area.

This non-bearing area is an area for transferring the heat from the anode target 62, which is transferred to the rotary body 68, to the stationary body 69. The non-bearing area has a shorter distance from the anode target 62 than the bearing area, so that the heat is transferred from the rotary body 68 to the stationary body 69 mainly along the heat transfer route through the non-bearing area. The non-bearing area is shown in an enlarged state in the circle of the drawing. A liquid metal lubricant 80 is filled in the gap between the rotary body 68 and the stationary body 69 in the non-bearing area.

During the operation, the temperature of the non-bearing area reaches, for example, about 400 to 500° C. At such temperatures, the component material (e.g., molybdenum or a molybdenum alloy) for the rotary body 68 and the stationary body 69 may react with the liquid metal lubricant to grow a reaction layer in the gap of the non-bearing area. But, rotational characteristics are prevented from being degraded because the gap is determined to have a large size.

On the other hand, the bearing area where the dynamic pressure type sliding bearings 75A, 75B, 76A, 76B are formed is far from the heat transfer route of the anode target 62 as compared with the non-bearing area, so that its temperature is kept at about 250° C. or below. Therefore, a mutual reaction between the bearing material and the liquid metal lubricant in the bearing area is suppressed, and bearing surface roughness and a change in size can be prevented. Thus, it is possible to maintain a stable bearing operation. The cooling medium passage in the stationary body 69 is formed to reach the connected portion between the connecting portion 63 and the rotary body 68, so that the heat transferred from the connecting portion 63 to the stationary body 69 through the rotary body 68 can be cooled efficiently.

In the fourth embodiment shown in FIG. 12, each connection between the anode target 62 and the connecting portion 63 and between the rotary body 68 and the connecting portion 63 is made by metal junction. Thus, the heat transfer routes from the anode target 62 to the rotary body 68 are integrally formed metallographically. Therefore, there is no simple contact of metal surfaces in the heat transfer routes, and variations in heat resistance value of the heat transfer routes can be prevented.

In the embodiment shown in FIG. 12, the small-diameter section 681 and the large-diameter section 682 of the rotary body 68 may be formed separately and connected to form the rotary body 68. Similarly, the small-diameter section 691 and the large-diameter section 692 of the stationary body 69 can also be formed separately and connected to form the stationary body 69. It is desirable to apply a metal bonding method such as friction welding to the above connected portions. The small-diameter section 681 of the rotary body 68 and the small-diameter section 691 of the stationary body 69 are made of a material selected from, for example, molybdenum, a molybdenum alloy, tungsten, a tungsten alloy, tantalum and a tantalum alloy. The large-diameter section 682 of the rotary body 68 and the large-diameter section 692 of the stationary body 69 are formed of, for example, an iron-based metal mainly consisting of iron such as iron, steel, alloy steel, an iron-nickel alloy, an iron-chromium alloy or an iron-nickel-chromium alloy.

By configuring as described above, the bearing areas where the dynamic pressure type sliding bearings 75A, 75B, 76A, 76B are disposed are formed of, for example, an iron-based material, and it becomes possible to fabricate the bearings with high accuracy. Iron and an iron alloy are relatively inexpensive and can be fabricated easily as compared with molybdenum and tungsten. And, the efficiency of magnetic connection with the rotating magnetic field becomes high because they are ferromagnetic materials. It is desirable to form a heat-resistant coating of a high melting-point substance on the non-bearing area.

Besides, in the embodiment shown in FIG. 12, it is also effective to form a heat-resistant coating on the surface of the stationary body 69 in the non-bearing area. The heat-resistant coating can be formed by the above-described CVD process, PACVD process, MOCVD process, PVD process such as ion plating, thermal spaying, molten salt bath immersion or heat treating method in the atmosphere of gas. The area where the heat-resistant coating is formed is preferably limited to the non-bearing area where the rotary body 68 and the stationary body 69 do not contact mechanically. When the coating layer has a high degree of adhesion or abrasion resistance, it can also be formed on the bearing area.

Figure 13:
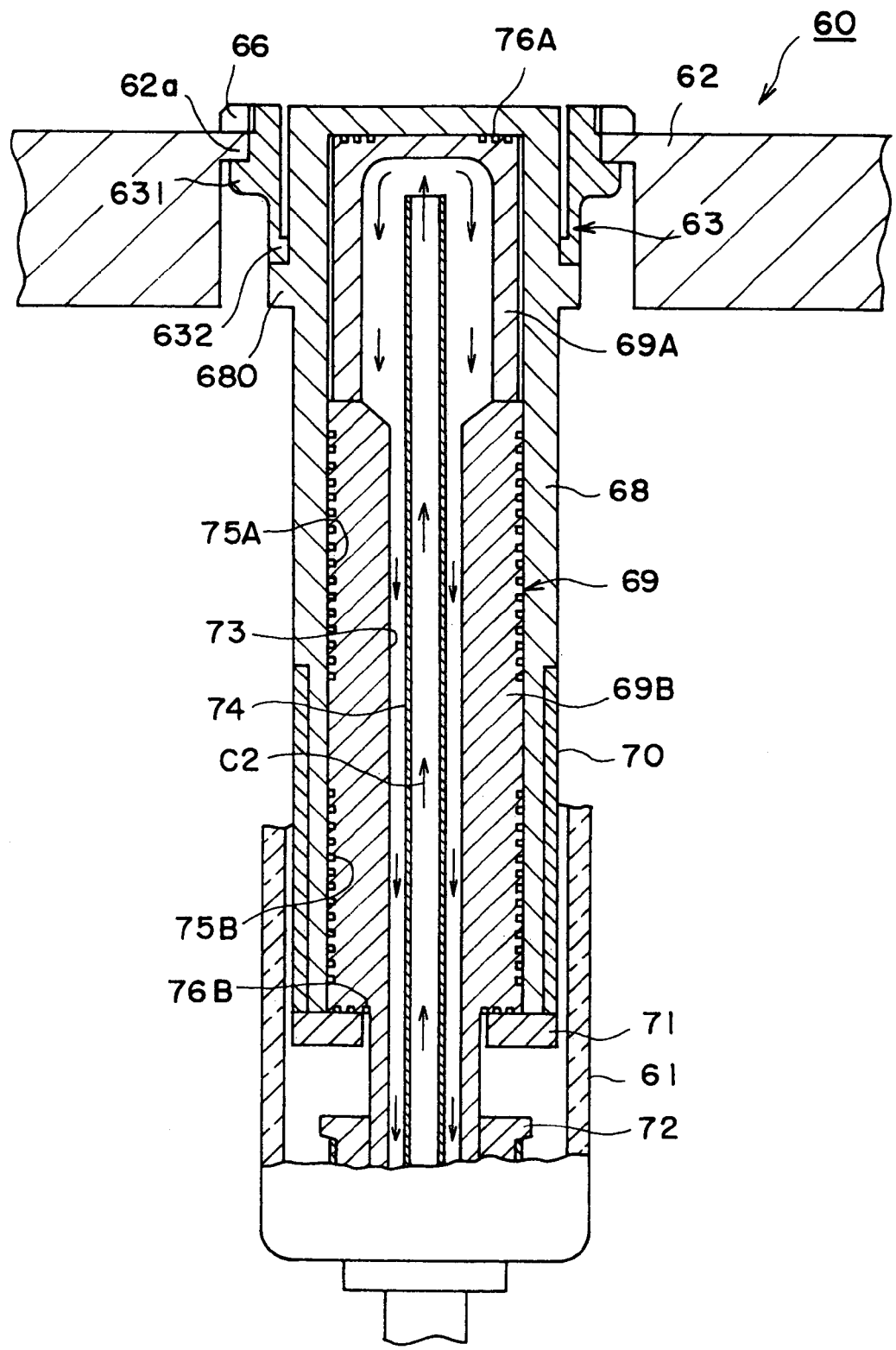
FIG. 13 is a vertical sectional diagram showing a structure of the main part of the rotary anode type X-ray tube according to a fifth embodiment of the second aspect of the invention.

Then, a fifth embodiment of the rotary anode type X-ray tube according to the second aspect of the invention will be described with reference to FIG. 13. In FIG. 13, same numerals are used to denote same parts in FIG. 9 to FIG. 12, and a repeated description of those portions is partially omitted. In the rotary anode type X-ray tube 60 of the fifth embodiment shown in FIG. 13, the inner diameter of the rotary body 68 and the outer diameter of the stationary body 69 are formed to have a uniform size, and the rotary body 68 and the stationary body 69 are mutually fitted.

In this structure, the outer diameter and inner diameter of the rotary body 68 and the stationary body 69 near the anode target 62 become larger as compared with the structure of FIG. 12, and the diameter of the hole 73 forming the cooling passage also has a large size on the side of the anode target 62. For example, the stationary body 69 is formed by separately forming a first portion 69A having a large hole diameter and a second portion 69B having a small hole diameter and diffusion welding them. In the structure of FIG. 13, the cooling medium flows upward in the pipe 74 as indicated by arrows C2, leaves the pipe 74 at the top end and flows downward along the outside wall of the pipe 74.

The area where the top end surface of the stationary body 69 and the rotary body 68 are mutually opposed has a short distance from the connected portion between the rotary body 68 and the connecting portion 63 and forms another heat transfer area. In this case, the bearing area and the heat transfer non-bearing area are formed on a common fitted surface, and the heat transferred from the connecting portion 63 to the rotary body 68 is partly transferred to the stationary body 69 through the heat transfer non-bearing area formed on the top end surface of the stationary body 69.

By configuring as described above, the contact area between the stationary body 69 and the cooling medium increases, a heat transfer rate from the anode target 62 to the cooling medium, namely a cooling efficiency of the anode target 62, is improved. Besides, the connection between the anode target 62 and the connecting portion 63 and between the rotary body 68 and the connecting portion 63 is made by metal bonding. Thus, the heat transfer routes from the anode target 62 to the rotary body 68 are integrally formed metallographically. Therefore, there is no simple contact of metal surfaces in the heat transfer routes, and variations in heat resistance value of the heat transfer routes can be prevented.

Figure 14:
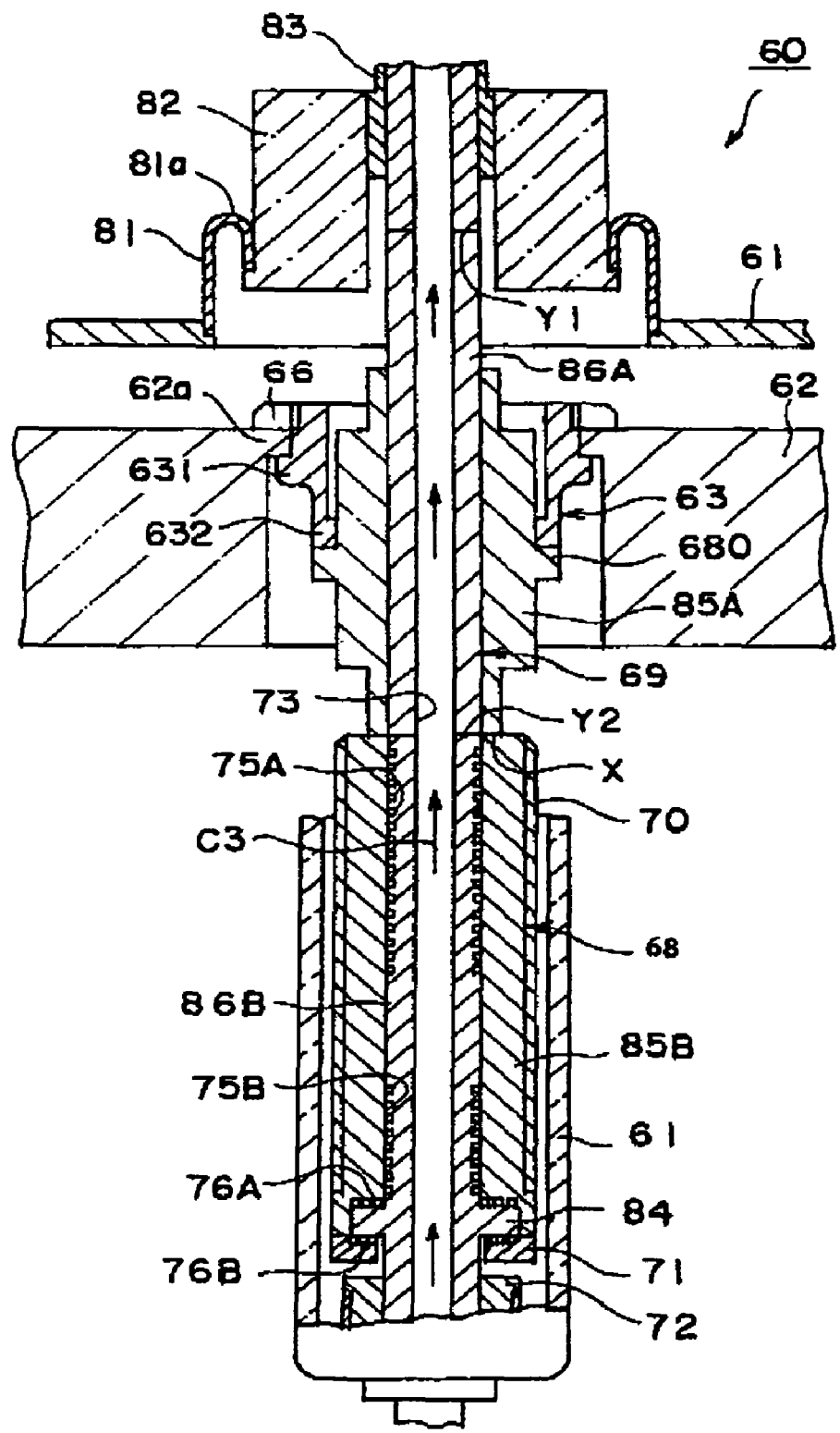
FIG. 14 is a vertical sectional diagram showing a structure of the main part of the rotary anode type X-ray tube according to a sixth embodiment of the second aspect of the invention.

Then, a sixth embodiment of the rotary anode type X-ray tube according to the second aspect of the invention will be described with reference to FIG. 14. In FIG. 14, same numerals are used to denote same parts in FIG. 9 to FIG. 13, and a repeated description of those portions is partially omitted. In the rotary anode type X-ray tube 60 of the sixth embodiment shown in FIG. 14, the top end of the stationary body 69 is fixed to a part of the vacuum vessel 61.

The vacuum vessel 61 has a first fixing member 81 having a cylindrical shape, and a second fixing member 82 having a cylindrical shape is connected air-tight to a bent portion 81a which is formed by inwardly bending the top end of the first fixing member 81. A third fixing member 83 having a cylindrical shape is connected air-tight to the inside of the second fixing member 82. And, the top end of the stationary body 69 is fixed air-tight to the inside of the third fixing member 83.

The stationary body 69 is comprised of different materials with two connected portions Y1, Y2 as interfaces, and an annular enlarged portion 84 is formed on a part next to the thrust ring 71. The hole 73 is formed as a cooling medium passage in the stationary body 69 from its top end to the bottom end in the tube axial direction. The top and bottom ends of the hole 73 are open to the outside of the vacuum vessel 61, and the cooling medium is fed through the bottom end opening and externally discharged from the top end opening as indicated by arrows C3.

The rotary body 68 is also formed of different materials with a connected portion X as an interface. The connecting portion 63 having the same structure as in FIG. 12 is connected to a first rotary body 85A which is located above the connected portion X. And, radial dynamic pressure type sliding bearings 75A, 75B are disposed in the fitted portion between a second rotary body 85B located below the connected portion X of the rotary body 68 and the stationary body 69. Thrust dynamic pressure type sliding bearings 76A, 76B are formed in an opposed portion between the top surface of the annular enlarged portion 84 of the stationary body 69 and the second rotary body 85B and an opposed portion between the bottom surface of the annular enlarged portion 84 and the thrust ring 71.

The fitted portion between the first rotary body 85A and the stationary body 69 is determined as a non-bearing area for heat transfer. The first rotary body 85A and a portion 86A of the stationary body 69 to be fitted thereto are formed of a high melting-point metal material as described above. And, the second rotary body 85B and a portion 86B of the stationary body 69 to be fitted thereto are formed of the above-described iron-based material. By the component materials as described above, the bearing accuracy and the like can be improved, and the heat transfer area properties can also be improved as described above.

In the structure shown in FIG. 14, both ends of the stationary body 69 are fixed to the vacuum vessel 61. Therefore, the anode target 62 and the rotating mechanism 64 are stably supported. And, the rotary body located on the side of the cathode can be made to have a small outer diameter, and withstand voltage properties can be secured because the dynamic pressure type sliding bearings 75A, 75B, 76A, 76B are formed on one side of the anode target 62. Where the rotary anode type X-ray tube 60 shown in FIG. 14 is used with the anode grounded, a member for fixing the stationary body 69 to the vacuum vessel 11, such as the first fixing member 81, the second fixing member 82 or the third fixing member 83, is formed of a metal.

Figure 15:
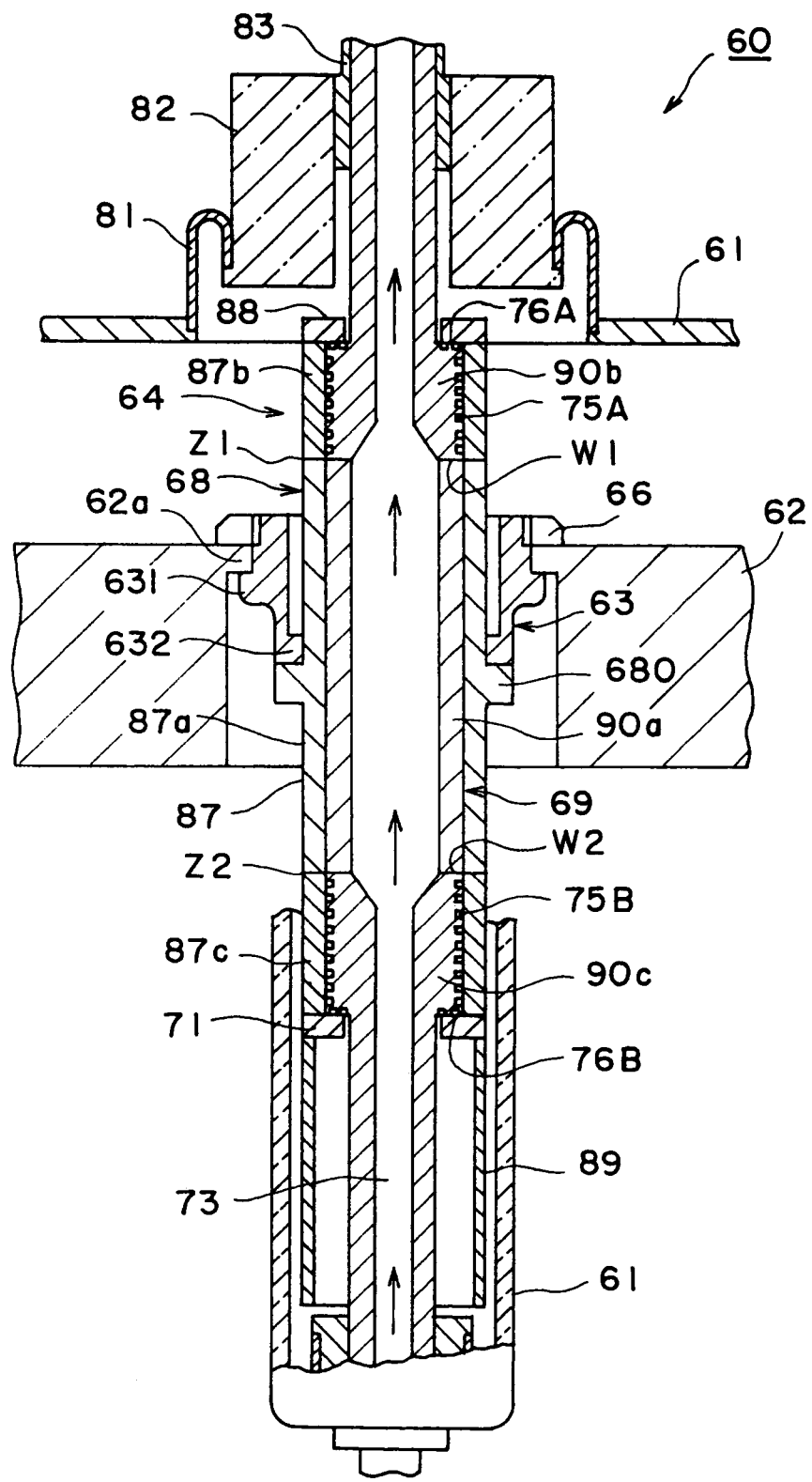
FIG. 15 is a vertical sectional diagram showing a structure of the main part of the rotary anode type X-ray tube according to a seventh embodiment of the second aspect of the invention.

Then, a seventh embodiment of the rotary anode type X-ray tube according to the second aspect of the invention will be described with reference to FIG. 15. In FIG. 15, same numerals are used to denote same parts in FIG. 9 to FIG. 14, and a repeated description of those portions is partially omitted. In the rotary anode type X-ray tube 60 of the seventh embodiment shown in FIG. 15, the rotary body 68 is comprised of a cylindrical portion 87 and a sealing ring 88 for sealing its upper opening.

The cylindrical portion 87 of the rotary body 68 is comprised of different materials with two connected portions Z1, Z2 as interfaces. The connecting portion 63 is connected to an'intermediate cylindrical portion 87a held between the two connected portions Z1, Z2, and the intermediate cylindrical portion 87a is formed of the above-described high melting-point metal material. An upper cylindrical portion 87b and the sealing ring 88 located above the connected portion Z1 and a lower cylindrical portion 87c and the thrust ring 71 located below the connected portion Z2 are formed of the above-described iron-based material. A high conductive cylindrical member 89, which generates a rotational torque by a rotating magnetic field produced by a stator coil (not shown), is disposed below the thrust ring 71.

The top end of the stationary body 69 extends upward through the sealing ring 88 and is fixed to the vacuum vessel 61. The bottom end of the stationary body 69 extends downward through the thrust ring 71. The stationary body 69 is comprised of different materials with two connected portions W1, W2 as interfaces. An intermediate portion 90a held between the two connected portions W1, W2 is formed of the above-described high melting-point metal material. An upper portion 90b located above the connected portion W1 and a lower portion 90c located below the connected portion W2 are formed of the above-described iron-based material.

The fitted portion between the intermediate cylindrical portion 87a of the rotary body 68 and the intermediate portion 90a of the stationary body 69 forms a heat transfer non-bearing area, and the hole 73 configuring a cooling medium passage has a large inner diameter at the intermediate portion 90a of the stationary body 69. Radial dynamic pressure type sliding bearings 75A, 75B are formed in the upper cylindrical portion 87b and the lower cylindrical portion 87c of the rotary body 68. Thrust dynamic pressure type sliding bearings 76A, 76B are respectively formed in the opposed area between the sealing ring 88 and the stationary body 69 and between the thrust ring 71 and the stationary body 69.

In the structure shown in FIG. 15, the anode target 62 and the rotating mechanism 64 are stably supported because both ends of the stationary body 69 are fixed to the vacuum vessel 61. And, the dynamic pressure type sliding bearings 75A, 75B, 76A, 76B are disposed on either side of the anode target 62. In this case, loads applied to the upper and lower bearings are in good balance, and a stable bearing function is realized.

Besides, a high melting-point metal such as molybdenum or an iron-based alloy such as SKD11 can be used as a material configuring the bearing surface. The high melting-point metal has disadvantages that galling tends to occur, material and fabrication costs are high, and the like. The iron-based base metal is resistant to galling, and the material and fabrication costs are reduced, but it has a disadvantage that it tends to react with the liquid metal lubricant. But, the reaction with the liquid metal lubricant can be suppressed by forming a cooling medium passage in the stationary body 69 so to have a cooling structure. Therefore, it is desirable to adopt the iron-based base metal.

Meanwhile, a material configuring a heat transfer fitted surface (non-bearing area) is preferably a high melting-point metal such as molybdenum positioned on the side of the rotary body to be connected to the connecting portion 63. In this case, it is desirable that the high melting-point metal is also used on the side of the stationary body in order to prevent a change in gap size due to a difference in thermal expansion caused by a temperature increase during the operation. But, a structure using an iron alloy or having a heat-resistant coating formed thereon can also be used because dimensional accuracy required for the gap of the heat transfer fitted portion is not so high as compared with that required for the bearing portion.

For example, when the bearing fitted surface and the heat transfer non-bearing fitted surface are not common in the above-described embodiments according to the second aspect of the invention, herringbone pattern or spiral pattern helical grooves can also be formed in the heat transfer non-bearing fitted surface. Such grooves have a function to retain the liquid metal lubricant in the gap of the fitted portion, so that good heat transfer from the rotary body to the stationary body can be achieved.

And, to apply the diffusion welding, a material selected from Ti, Pt, Zr, V, Rh and alloy mainly consisting of such metals is used as the diffusion promoter. A metal material having a saturated vapor pressure of $1 \times 10^{-6}$ Pa or less at 1000° C. is used as the diffusion promoter. The diffusion promoter is disposed between two members to be connected. The diffusion promoter may be applied to the surfaces of the members to be connected.

In the structures shown in FIG. 14 and FIG. 15, the rotary body portion and the stationary body portion are formed of different materials. The rotary body portion and the stationary body portion may be integrally formed using the same material. Where they are integrally formed, a mechanical strength increases because the connected portion is not corroded by, for example, the liquid metal lubricant.

According to the structures of the embodiments described above, variations in heat resistance of the heat transfer route to which the heat of the anode target is transferred is remedied. In this case, the quantity of heat transferred from the rotary body to the stationary body can be increased in a range that a stable bearing operation is not deteriorated by the reaction between the material configuring the bearing surface and the liquid metal lubricant. As a result, the quantity of heat transferred to the cooling fluid flowing through the stationary body can be increased, so that it becomes possible to improve the properties of the rotating anode type X-ray tube.

Figure 16:
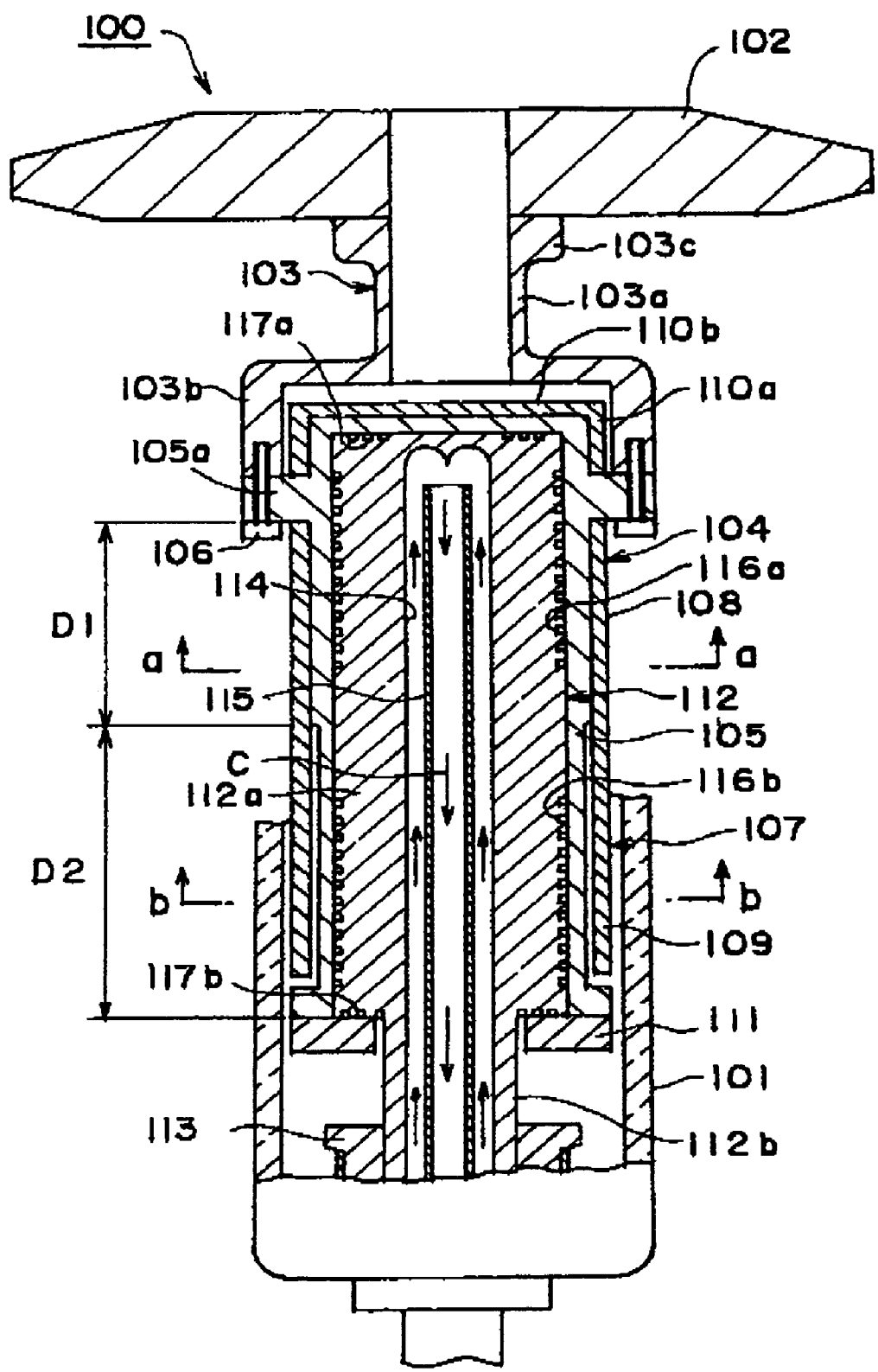
FIG. 16 is a vertical sectional diagram showing a structure of the main part of the rotary anode type X-ray tube according to a first embodiment of a third aspect of the invention.

Then, embodiments of the rotary anode type X-ray tube according to a third aspect of the invention will be described. FIG. 16 is a vertical sectional diagram showing a structure of the main part of the rotary anode type X-ray tube according to a first embodiment of the third aspect of the invention. A rotary anode type X-ray tube 100 shown in FIG. 16 has a vacuum vessel 101 of, for example, glass. An anode target 102 is disposed in the vacuum vessel 101. The anode target 102 is connected to a connecting portion 103. The connecting portion 103 is formed to have a cylindrical shape as a whole so as to have a heat-insulated structure with an area, where the heat of the anode target 102 is transferred, made small.

The connecting portion 103 is comprised of a first cylindrical portion 103a located on the side of the anode target 102 and a second cylindrical portion 103b having larger inner and outer diameters than those of the first cylindrical portion 103a. A flange 103c is formed on the end of the first cylindrical portion 103a on the side of the anode target 102, and the anode target 102 is connected to the top surface of the flange 103c by friction welding or the like. And, the second cylindrical portion 103b is connected to a rotating mechanism 104 which rotatably supports the anode target 102.

The rotating mechanism 104 is comprised of a rotary portion and a stationary portion, and the connecting portion 103 is connected to an inner rotary body 105 which configures the rotary portion and has a bottomed cylindrical shape. An annular projection 105a is formed on the outer peripheral surface of the inner rotary body 105, and the end surface of the second cylindrical portion 103b of the connecting portion 103 is connected to the top surface (the surface on the side of the anode target 102) of the projection 105a by diffusion welding or the like. They are also fixed with screws 106.

A copper outer rotary body 107 is connected to the outer peripheral surface below the projection 105a of the inner rotary body 105. The outer rotary body 107 has an integral structure of a heat transfer promoter 108 which is located on the side of the anode target 102 and a rotor 109 which is located on the side far from the anode target 102. The inner rotary body 105 and the outer rotary body 107 are mutually connected in an area D1 on the side of the anode target 102, and a gap is formed between the inner rotary body 105 and the outer rotary body 107 in an area D2 below it.

The top end of the heat transfer promoter 108 of the outer rotary body 107 is contacted to the bottom surface of the projection 105a. And, copper heat transfer promoters 110a, 110b are connected to the outer peripheral surface of the inner rotary body 105 located above the projection 105a and the top end surface of the inner rotary body 105. The annular bottom end of the heat transfer promoter 110a is in contact with the top surface of the projection 105a.

The bottom opening of the inner rotary body 105 is sealed with the thrust ring 111. The thrust ring 111 is fixed to the inner rotary body 105 to form the rotary portion of the rotating mechanism 104 together with the inner rotary body 105 and the outer rotary body 107. A stationary body 112 is fitted in the space formed by the inner rotary body 105 and the thrust ring 111.

The stationary body 112 configures the stationary portion of the rotating mechanism 104. The stationary body 112 has a large-diameter section 112a fitted to the inside of the inner rotary body 105 and the thrust ring 111 and a small-diameter section 112b having a smaller outer diameter, and the small-diameter section 112b extends through the thrust ring 111 so that its bottom end extends to the outside of the vacuum vessel 101. The bottom end of the stationary body 112 is fixed to the vacuum vessel 101 via a holding member 113. A hole 114 is provided to form a cooling medium passage in the stationary body 112 along the tube axis, and a pipe 115 is disposed in the hole 114. The cooling medium flows in the direction indicated by arrows C.

The dynamic pressure type sliding bearing is disposed in the fitted portions between the stationary body 112 and the inner rotary body 105 of the rotating mechanism 104 and between the stationary body 112 and the thrust ring 111. Specifically, helical grooves 116a, 116b are formed in two separate areas from each other in the tube axial direction of the fitted portion between the inner peripheral surface of the inner rotary body 105 and the outer peripheral surface of the stationary body 112. The liquid metal lubricant is supplied to the helical grooves 116a, 116b to form the radial dynamic pressure type sliding bearings. And, helical grooves 117a, 117b are formed in the top end surface and stepped surface of the stationary body 112. The liquid metal lubricant is supplied to the helical grooves 117a, 117b to form the thrust dynamic pressure type sliding bearings.

Figure 17:
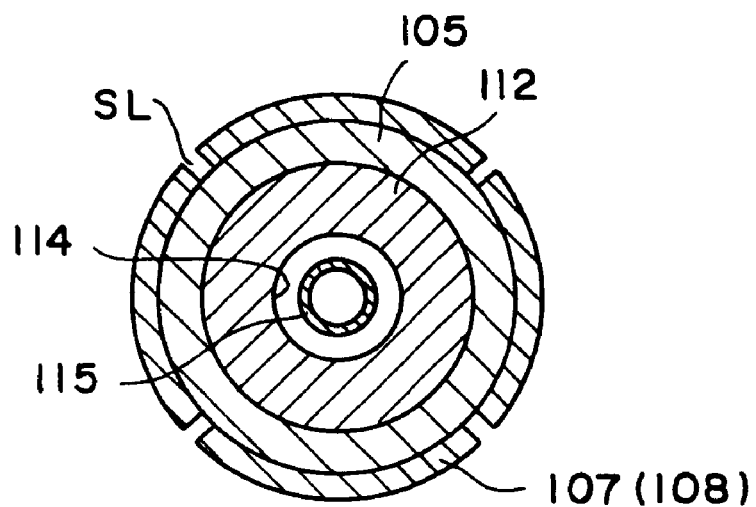
FIG. 17 is a transverse sectional diagram taken along line a—a of the rotary anode type X-ray tube shown in FIG. 16.
Figure 18:
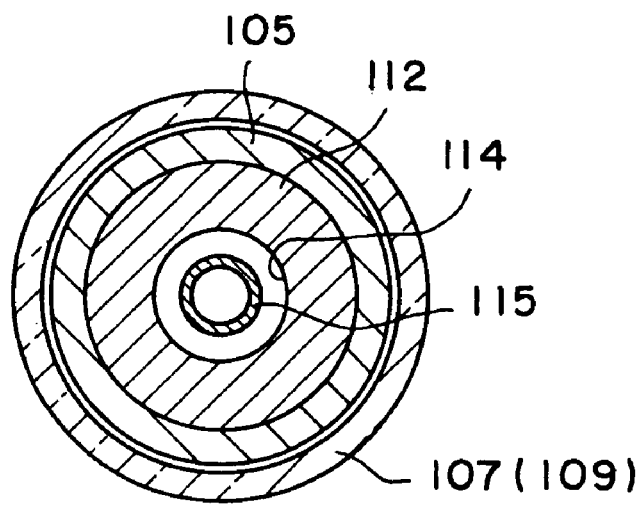
FIG. 18 is a transverse sectional diagram taken along line b—b of the rotary anode type X-ray tube shown in FIG. 16.

Here, a section of the area D1 taken along line a–a is shown in FIG. 17, and a section of the area D2 taken along line b—b is shown in FIG. 18. As shown in FIG. 17, the outer rotary body 107 in the area D1, namely the heat transfer promoter 108, is divided into four by slits SL extending in the tube axial direction. As shown in FIG. 18, the outer rotary body 107 in the area D2, namely the rotor 109, is formed into a cylinder. The length of the slits SL in the tube axial direction is longer than the connected portion with the inner rotary body 105. Thus, a stress produced in the connected portion with the inner rotary body 105 during manufacturing is reduced.

In the rotary anode type X-ray tube 100 having the above-described structure, a rotational torque is produced in the rotor 109 of the outer rotary body 107 by a rotating magnetic field generated by a stator coil (not shown) disposed outside of the vacuum vessel 101. This rotational torque is transferred to the anode target 102 through the connecting portion 103 to rotate the anode target 102. In this state, an electron beam is irradiated to the anode target 102 to emit X-rays from the anode target 102.

When the rotary anode type X-ray tube 100 starts to operate, the temperature of the anode target 102 is increased by irradiation of the electron beam. The heat of the anode target 102 is mostly dissipated by radiation but partly transferred to the inner rotary body 105 through the connecting portion 103 which is connected thermally or mechanically. The heat transferred to the inner rotary body 105 is further transferred to the stationary body 112 through the gap (bearing area) between the stationary body 112 and the inner rotary body 105 located behind the projection 105a.

At this time, the heat transferred to the projection 105a is partly transferred to the upper part of the projection 105a of the inner rotary body 105 through the heat transfer promoters 110a, 110b and further transferred from its bottom part and the like to the stationary body 112 through the gap between the inner rotary body 105 and the stationary body 112. The heat is also partly transferred to the lower part of the projection 105a through the heat transfer promoter 108 of the outer rotary body 107 and transferred from the inner rotary body 105 to the stationary body 112. And, the heat is externally dissipated from the stationary body 112 by the cooling medium flowing through the cooling passage. The liquid metal lubricant is filled in the bearing area and the non-bearing area of the fitted portion between the inner rotary body 105 and the stationary body 112. Therefore, the heat is finely transferred from the inner rotary body 105 to the stationary body 112 through the liquid metal lubricant.

According to the above-described structure, the heat of the anode target 102 is transferred from the projection 105a to upper and lower directions by the heat transfer promoters 108, 110a, 110b, so that it can be transferred from the large area of the inner rotary body 105 to the stationary body 112. Therefore, an effective contact area with the cooling medium increases, enabling to improve the cooling efficiency. And the heat transferred to the inner rotary body 105 is widely dispersed by the heat transfer promoters 108, 110a, 10b, so that the inner rotary body 105 is not required to be made thick, and the rotary anode type X-ray tube 100 can be made compact.

In the above-described embodiment, the heat transfer promoters 108, 110a, 10b are disposed on both sides of the projection 105a in the tube axial direction to transfer the heat from the large area of the inner rotary body 105 to the stationary body 112. The heat transfer promoters may be disposed on only one side of the projection 105a. The heat transfer promoters are not required to be disposed on the entire outer surface of the inner rotary body 105 and can be selectively disposed on an area where the heat of the anode target 102 is transferred, for example, in the vicinity of the projection 105a.

The anode target 102 and the connecting portion 103 are connected by metal bonding according to the friction welding or the like, and the connecting portion 103 and the inner rotary body 105 are connected by metal bonding such as diffusion welding. In this case, all the heat transfer routes from the anode target 102 to the inner rotary body 105 are connected metallographically. Therefore, there is no simple mechanical contact of metal surfaces in the heat transfer routes, and variations in heat resistance value of the heat transfer routes can be prevented. The heat transfer promoters 108, 110a, 10b are formed annularly with a prescribed width (e.g., a constant width) in the tube axial direction with respect to the outer surface of the inner rotary body 105. Thus, when the heat transfer promoters 108, 110a, 10b are made to have a prescribed width, variations in heat resistance value of the heat transfer routes are eliminated.

Figure 19:
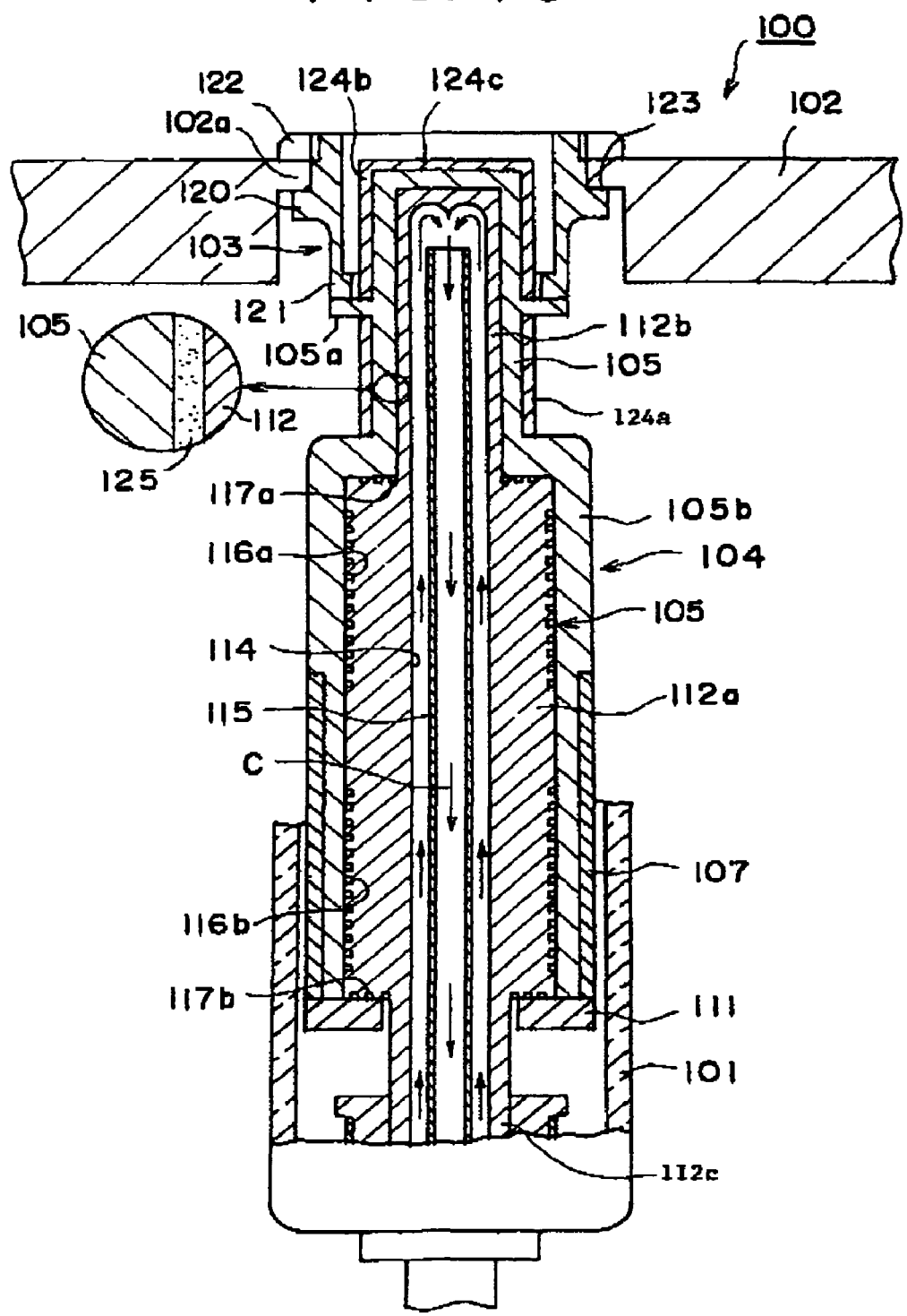
FIG. 19 is a vertical sectional diagram showing a structure of the main part of the rotary anode type X-ray tube according to a second embodiment of the third aspect of the invention.

Then, a second embodiment of the rotary anode type X-ray tube according to the third aspect of the invention will be described with reference to FIG. 19. In FIG. 19, same numerals are used to denote same parts in FIG. 16, and a repeated description of those portions is partially omitted. In the rotary anode type X-ray tube 100 of the second embodiment shown in FIG. 19, a thin portion 102a having a small thickness is formed around the through hole of the anode target 102. An annular stepped portion 120 externally protruded is formed on the outer peripheral surface of the cylindrical connecting portion 103, and an annular projection 121 inwardly protruded is formed on the bottom end of the connecting portion 103.

And, the anode target 102 is fixed by tightening the thin portion 102a with a nut 122 and the annular stepped portion 120. When fixing with the nut 122, the thin portion 102a and the annular stepped portion 120 are also connected by diffusion welding using a titanium foil 123. An annular projection 121 of the connecting portion 103 and the projection 105a of the inner rotary body 105 are connected by, for example, brazing.

The inner rotary body 105 is comprised of a small-diameter section 105a which has a small inner diameter and has a bottomed cylindrical shape and a large-diameter section 105b having a larger inner diameter. The small-diameter section 105a and the large-diameter section 105b are formed into, for example, an integral structure. An annular recess is formed in the lower outer peripheral surface of the inner rotary body 105, and an outer rotary body 107 is fitted to this recess. The outer rotary body 107 functions as a rotor which generates a rotational torque by a magnetic field applied from the outside.

The stationary body 112 has an integral structure of the large-diameter section 112a and first and second small-diameter sections 112b, 112c which are disposed on both sides of the large-diameter section 112a. The first small-diameter section 112a is fitted to the inside of the mall-diameter section 105a of the inner rotary body 105, and the large-diameter section 112a is fitted to the inside of the large-diameter section 105b of the inner rotary body 105.

And, helical grooves 117a are formed in the stepped surface of the stationary body 112 located on the side of the anode target 102, and thrust dynamic pressure type sliding bearings located on the side of the anode target 102 are disposed there. And, the cooling medium passage in the stationary body 112 extends to the vicinity of the anode target 102.

And, annular heat transfer promoters 124a, 124b are connected to the outer peripheral surface of the small-diameter section 105a located below the projection 105a of the inner rotary body 105 and to the outer peripheral surface of the small-diameter section 105a located above the projection 105a. Besides, a heat transfer promoter 124c is connected to the end surface of the small-diameter section 105a. The annular top end surface of the heat transfer promoter 124a and the annular bottom end surface of the heat transfer promoter 124b are in contact with the projection 105a.

The gap of the fitted area between the small-diameter section 105a of the inner rotary body 105 and the small-diameter section 112b of the stationary body 112 is determined to be, for example, in a range of 30 to 500 μm, which is a non-bearing area larger than the gap of the bearing area where the helical grooves are formed. The liquid metal lubricant is filled in this non-bearing area in the same way as the bearing area. The non-bearing area structure is shown in an enlarged state in the circle of the drawing. A liquid metal lubricant 125 is filled in the gap between the inner rotary body 105 and the stationary body 112. The non-bearing area is disposed where a distance to the anode target is shorter, or a time for heat transfer is shorter, as compared with the bearing area.

In the above-described structure, the heat of the anode target 102 is also transferred from the connecting portion 103 to the projection 105a of the inner rotary body 105. And, the heat is transferred to the large area of the inner rotary body 105 through the heat transfer promoters 124a, 124b, 124c and from the large area of the inner rotary body 105 to the stationary body 112. Then, the heat is externally dissipated from the stationary body 112 through the cooling medium flowing through the cooling passage. Thus, an effective contact area with the cooling medium is increased, and the cooling efficiency is improved. Besides, the heat transfer routes from the anode target 102 to the stationary body 112 mainly include the non-bearing area, so that the bearing area can be suppressed from having a temperature increase.

Figure 20:
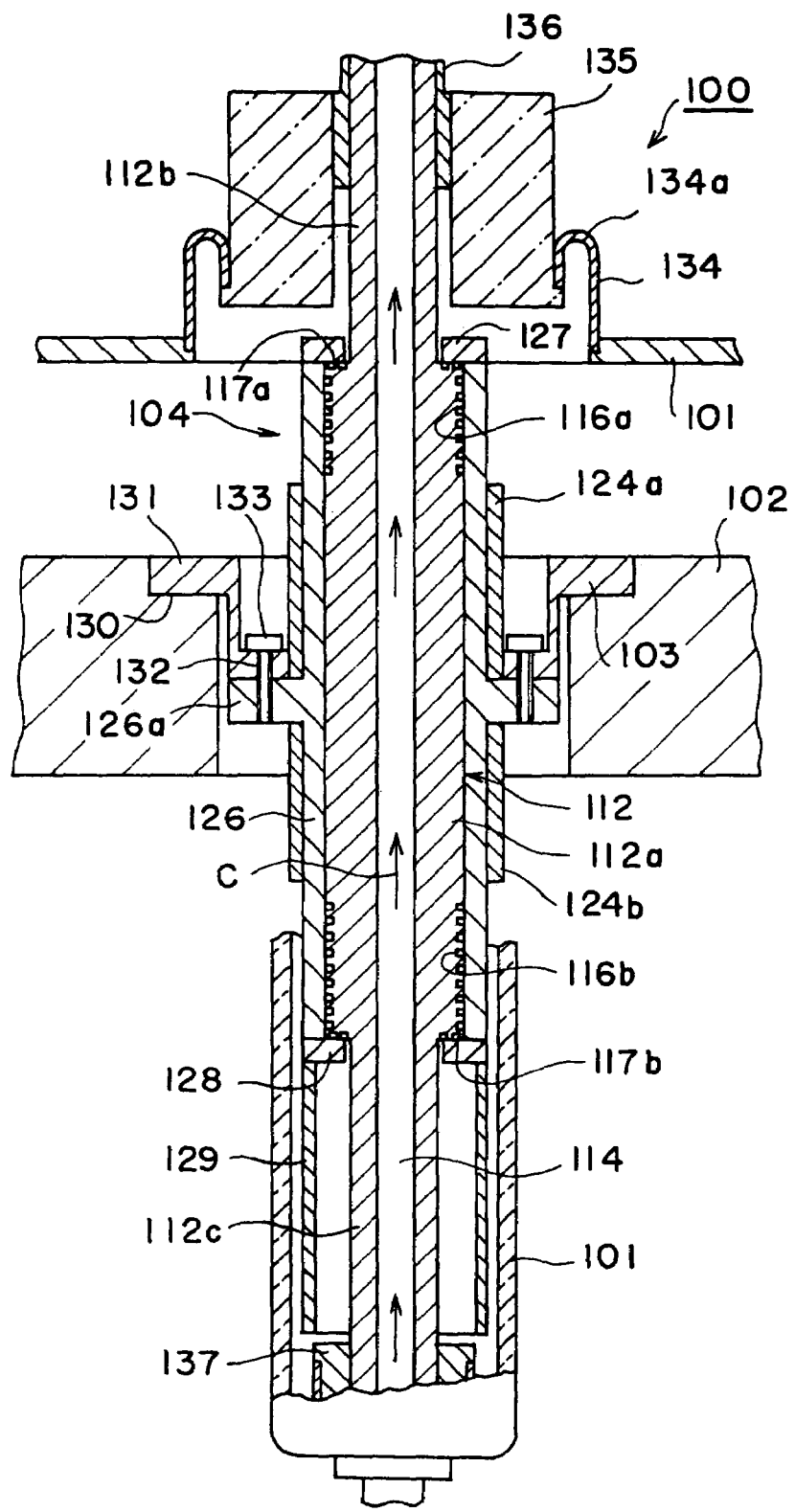
FIG. 20 is a vertical sectional diagram showing a structure of the main part of the rotary anode type X-ray tube according to a third embodiment of the third aspect of the invention.

Then, a third embodiment of the rotary anode type X-ray tube according to the third aspect of the invention will be described with reference to FIG. 20. In FIG. 20, same numerals are used to denote same parts in FIG. 16 and FIG. 19, and a repeated description of those portions is partially omitted. In the rotary anode type X-ray tube 100 of the third embodiment shown in FIG. 20, the rotary portion configuring the rotating mechanism 104 is comprised of a cylindrical portion 126, first and second thrust rings 127, 128 for sealing the top and bottom openings thereof, and a cylindrical rotor 129 located below the second thrust ring 128. The cylindrical rotor 129 generates a rotational torque by a rotating magnetic field generated by a stator coil (not shown). This rotational torque is transferred to the anode target 102 to rotate the anode target 102.

An annular projection 126a is formed on outer peripheral surface of the cylindrical portion 126, and the connecting portion 103 is fixed to the projection 126a. An annular stepped portion 130 is formed on the edge of the through hole formed at the center of the anode target 102, and an outer projection 131 located on the top end of the connecting portion 103 is connected to the stepped portion 130. An inner projection 132 located on the bottom end of the connecting portion 103 and the annular projection 126a of the cylindrical portion 126 are diffusion-welded and also fixed with screws 133. Heat transfer promoters 124a, 124b are connected to the outer peripheral surface of the cylindrical portion 126 located above and below the annular projection 126a. The heat transfer promoters 124a, 124b have their ends in contact with the annular projection 126a.

The stationary body 112 is comprised of a large-diameter section 112a which is fitted to the cylindrical portion 126 and first and second small-diameter sections 112b, 112c which are continuously formed above and below it. The top end of the first small-diameter section 112b is fixed to the vacuum vessel 101. Specifically, a first fixing member 134 which is cylindrical is connected air-tight to a part of the vacuum vessel 101. A second fixing member 135 which is cylindrical is connected air-tight to a bent portion 134a which is formed by inwardly bending the top end of the first fixing member 134, and a third fixing member 136 which is cylindrical is connected air-tight to the inside of the second fixing member 135. The top end of the stationary body 112 is fixed air-tight to the inside of the third fixing member 136.

The second small-diameter section 112c of the stationary body 112 extends through the second thrust ring 128 to the outside of the vacuum vessel 101 and fixed to the vacuum vessel 101 with a holding member 137. A hole 114 is formed in the stationary body 112 from its top end to the bottom end in the tube axial direction to form a cooling medium passage. And, radial dynamic pressure type sliding bearings and thrust dynamic pressure type sliding bearings are formed in fitted portions between the cylindrical portion 126, the first and second thrust rings 127, 128 and the large diameter section 112a of the stationary body 112. The areas where the heat transfer promoters 124a, 124b are formed are determined to be non-bearing areas having a gap larger than that of the bearing area.

In the embodiment shown in FIG. 20, both ends of the stationary body 112 are fixed to the vacuum vessel 101. Therefore, the anode target 102 and the rotating mechanism 104 are supported stably. And, loads applied to the upper and lower bearings are in good balance, and a stable bearing function is achieved because the dynamic pressure type sliding bearing is disposed on both sides of the anode target 102.

In the above-described embodiment of the third aspect of the invention, the heat transfer promoters are formed of copper. As a material for forming the heat transfer promoters, a composite reinforced metal material mainly consisting of a copper alloy or copper, a high heat conduction metal such as molybdenum, or the like can be used. Besides, a composite material having the holes of a sintered material containing at least one element, which is selected from molybdenum, a molybdenum alloy, tantalum, a tantalum alloy, tungsten, a tungsten alloy or tungsten carbide, impregnated with a metal material such as copper or silver can also be used. A composite material consisting of the metal material such as copper or silver and a ceramics material which does not form a solid solution with the metal material but is dispersed into the metal or a composite material consisting of the metal material such as copper or silver and graphite may be used.

As described above, various types of materials having a heat conduction rate higher than that of the rotary body of the rotating mechanism can be used for the heat transfer promoters. Especially, the heat transfer promoter is desirably formed of a material having a heat conduction rate of 100

W/mK or higher (normal temperature). The rotary body and the heat transfer promoter are preferably connected by brazing or diffusion welding. And, the heat transfer promoter is generally formed into, for example, a cylinder shape to fit to the shape of the outer peripheral surface of the rotary body. If connection might cause deformation because of a difference in thermal expansion or the like with the rotary body, slits may be formed in the connected portion in the tube axial direction. Instead of the cylindrical shape, plural heat transfer promoter pieces having a prescribed width and length may be connected to the outer peripheral surface of the rotary body.

Where the anode target is connected to the connecting portion, molybdenum or a molybdenum alloy is used for the connecting portion, and molybdenum, a molybdenum alloy, iron or an iron alloy is used for the connected portion with the connecting portion of the rotary body because the heat of the anode target is directly transferred. The anode target can be directly connected to the rotary body without using the connecting portion. A heat pipe or the like can also be used for the cooling mechanism in the stationary body.

INDUSTRIAL APPLICABILITY

According to the rotary anode type X-ray tube of the present invention, the heat of the anode target can be dissipated effectively through the rotating mechanism or the like. The rotary anode type X-ray tube of this invention is effectively used for various types of X-ray generator and the like because it has remarkable operation characteristics and reliability.

What is claimed is:

1. A rotary anode type X-ray tube, comprising:
   a vacuum vessel;
   an anode target disposed in the vacuum vessel and having a through hole; and
   a rotating mechanism rotatably supporting the anode target,
   the rotating mechanism comprising a rotary body having a cylindrical shape and connected to the anode target and a stationary body fitted in the rotary body and having a passage for flowing a cooling medium therein,
   wherein the rotating mechanism has a first area and a second area in an axial direction, the first area where the rotary body and the stationary body are mutually opposed with a first gap therebetween and dynamic pressure type sliding bearings are disposed and the second area where the rotary body and the stationary body are mutually opposed with a second gap larger than the first gap therebetween and filled with a liquid metal lubricant, and a portion of the second area is inserted into the through hole of the anode target to form an anode target supporting section surrounded by the through hole, wherein the passage for flowing a cooling medium is formed in at least the stationary body of the anode target supporting section in the second area, and the first area is connected to the second area in an axial direction in turn, and the rotary body in the second area has a heat transfer path formed of a metal having a high melting temperature of Mo or a Mo alloy at least at an outside thereof in a radial direction such that heat produced in the anode target transfers through the rotary body in the second area.

2. The rotary anode type X-ray tube according to claim 1, wherein the rotary body opposed to the second area is located where heat of the anode target transferred per unit area or unit time is in larger quantity as compared with the rotary body opposed to the first area.

3. The rotary anode type X-ray tube according to claim 1, wherein the rotary body has a first rotary body on which the first area is disposed and a second rotary body which is connected to the anode target and provided with the second area.

4. The rotary anode type X-ray tube according to claim 1, wherein a surface of at least one of the rotary body and the stationary body opposed to the second area is coated with a high melting-point substance.

5. The rotary anode type X-ray tube according to claim 1, further comprising:
   a heat transfer promoter which is connected to an outer surface of the rotary body and formed of a member having a heat conduction rate higher than that of the rotary body.

6. The rotary anode type X-ray tube according to claim 5, wherein an inner surface of the rotary body to which the heat transfer promoter is connected is in contact with the liquid metal lubricant.

7. The rotary anode type X-ray tube according to claim 5, wherein the rotary body has a projection to which heat of the anode target is transferred, and the heat transfer promoter is connected to at least one outer surface of the rotary body positioned on both sides of the projection.

8. The rotary anode type X-ray tube according to claim 1, wherein the first gap is in a range of 10 to 30 μm, and the second gap is in a range of 30 to 500 μm.

9. The rotary anode type X-ray tube according to claim 1, wherein, in the first area of the rotating mechanism, a pair of herringbone pattern helical grooves are formed on two upper and lower portions of an exterior of the stationary body, and radial dynamic pressure type sliding bearings are disposed.

* * * * *